(12) United States Patent
Petre et al.

(10) Patent No.: US 10,404,299 B1
(45) Date of Patent: Sep. 3, 2019

(54) SYSTEM FOR PARALLELIZED COGNITIVE SIGNAL DENOISING

(71) Applicant: HRL Laboratories, LLC, Malibu, CA (US)

(72) Inventors: Peter Petre, Oak Park, CA (US); Bryan H. Fong, Los Angeles, CA (US); Shankar R. Rao, Agoura Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 15/910,922

(22) Filed: Mar. 2, 2018

Related U.S. Application Data

(63) Continuation-in-part of application No. 15/817,906, filed on Nov. 20, 2017, and a continuation-in-part of application No. 15/631,307, filed on Jun. 23, 2017, and a continuation-in-part of application No. 15/452,412, filed on Mar. 7, 2017, and a continuation-in-part of application No. 15/452,155, filed on Mar. 7, 2017.

(Continued)

(51) Int. Cl.
*H04B 1/10* (2006.01)
*G06N 3/04* (2006.01)

(52) U.S. Cl.
CPC .................. *H04B 1/10* (2013.01); *G06N 3/04* (2013.01)

(58) Field of Classification Search
CPC .................................... H04B 1/10; G06N 3/04
USPC .................................................. 375/295, 296
See application file for complete search history.

(56) References Cited

U.S. PATENT DOCUMENTS 5,694,474 A * 12/1997 Ngo ..................... G06K 9/0057
381/66
6,691,073 B1 2/2004 Erten
(Continued)

OTHER PUBLICATIONS

R. Legenstein, et al. "Edge of Chaos and Prediction of Computational Performance for Neural Microcircuit Models," Neural Networks 20 (2007), pp. 323-334.

(Continued)

*Primary Examiner* — Chieh M Fan
*Assistant Examiner* — Fitwi Hailegiorgis
(74) *Attorney, Agent, or Firm* — Tope-McKay & Associates

(57) ABSTRACT

Described is a cognitive signal processor (CSP) for signal denoising. In operation, the CSP receives a noisy signal as a time-series of data points from a mixture of both noise and one or more desired waveform signals. The noisy signal is linearly mapped to reservoir states of a dynamical reservoir. A high-dimensional state-space representation is then generated of the noisy signal by combining the noisy signal with the reservoir states. A delay-embedded state signal is generated from the reservoir states. The reservoir states are denoised by removing noise from each reservoir state signal, resulting in a real-time denoised spectrogram of the noisy signal. A denoised waveform signal is generated combining the denoised reservoir states. Additionally, the signal denoising process is implemented in software or digital hardware by converting the state-space representation of the dynamical reservoir to a system of delay difference equations and then applying a linear basis approximation.

23 Claims, 22 Drawing Sheets

Related U.S. Application Data

(60) Provisional application No. 62/500,966, filed on May 3, 2017, provisional application No. 62/447,883, filed on Jan. 18, 2017, provisional application No. 62/379,634, filed on Aug. 25, 2016, provisional application No. 62/304,623, filed on Mar. 7, 2016.

(56) References Cited

U.S. PATENT DOCUMENTS

| | | | |
|---|---|---|---|
| 7,474,756 B2 | 1/2009 | Ricard et al. | |
| 8,031,117 B2* | 10/2011 | Goldberg | H04B 7/0854 342/377 |
| 9,042,496 B1* | 5/2015 | Su | H04L 27/0012 375/346 |
| 2005/0047611 A1 | 3/2005 | Mao | |
| 2005/0267377 A1 | 12/2005 | Marossero | |
| 2010/0158271 A1 | 6/2010 | Park et al. | |
| 2012/0207195 A1 | 8/2012 | Kawasaki | |
| 2012/0232418 A1 | 9/2012 | Kimura | |
| 2013/0304395 A1 | 11/2013 | Naidu | |
| 2016/0203827 A1 | 7/2016 | Leff | |

OTHER PUBLICATIONS

W. Maass, "Liquid Computing", Proc. of the Conference CiE'07: Computability in Europe 2007, Siena (Italy), ), CiE 2007, LNCS 4497, pp. 507-516, 2007.
S. Choi, A. Cichocki, H.-M. Park, and S.-Y. Lee, "Blind Source Separation and Independent Component Analysis: A Review," Neural Information Processing—Letters, vol. 6, No. 1, Jan. 2005, pp. 1-57.
A. Cichocki and A. Belouchrani, "Sources separation of temporally correlated sources from noisy data using a bank of band-pass filters," in Proc. of Independent Component Analysis and Signal Separation (ICA-2001), pp. 173-178, San Diego, USA, Dec. 9-13, 2001.
A. Hyvarinen, "Complexity Pursuit: Separating Interesting Components from Time Series," Neural Computation, vol. 13, No. 4, pp. 883-898, Apr. 2001.
Igel, C. and Husken, M., "Improving the Rprop learning algorithm", in Proc. of the 2nd Int. Symposium on Neural Computation (NC'2000), pp. 115-121, ICSC Academic Press, 2000.
R. H. Walden, "Analog-to-digital converter survey and analysis," IEEE J. Sel. Areas Commun., vol. 51, pp. 539-548, 1999.
C. Igel and M. Husken, "Improving the Rprop learning algorithm", in Proc. of the 2nd Int. Symposium on Neural Computation (NC'2000), pp. 115-121, ICSC Academic Press, 2000.
H. Jaeger, et al. "Harnessing nonlinearity: Predicting chaotic systems and saving energy in wireless communications," Science, vol. 304, No. 5667, pp. 78-80, 2004.
R. Legenstein, et al. "Edge of Chaos and Prediction of Computational Performance for Neural Microcircuit Models," Neural Networks, 20(3), 2007, pp. 323-334.
W. Maass, "Liquid Computing", Proc. of the Conference CiE'07: Computability in Europe 2007, Siena (Italy), 2007, pp. 507-516.
F. Takens, "Detecting Strange Attractors in Turbulence," Dynamical Systems and Turbulence, Lecture Notes in Mathematics vol. 898, 1981, pp. 366-381.
D. Verstraeten, et al. "An experimental unification of reservoir computing methods", Neural Networks, vol. 20, No. 3, Apr. 2007, pp. 391-403.
Walden, "Analog-to-digital converter survey and analysis," IEEE J. Sel. Areas Commun., vol. 51, pp. 539-548, 1999.
H. Yap, et al., "A First Analysis of the Stability of Takens' Embedding," in Proc. of the IEEE Global Conference on Signal and Information Processing (GlobalSIP) symposium on Information Processing for Big Data, Dec. 2014, pp. 404-408.
Office Action 1 for U.S. Appl. No. 15/631,307, dated Oct. 5, 2017.
Response to Office Action 1 for U.S. Appl. No. 15/631,307, dated Jan. 4, 2018.
Office Action 2 for U.S. Appl. No. 15/631,307, dated Apr. 19, 2018.
Response to Office Action 2 for U.S. Appl. No. 15/631,307, dated Jun. 18, 2018.
Notice of Allowance for U.S. Appl. No. 15/631,307, dated Jul. 18, 2018.
Notification of Transmittal of International Search Report and The Written Opinion of the International Searching Authority for PCT/US2017/062561; dated Feb. 6, 2018.
International Search Report of the International Searching Authority for PCT/US2017/062561; dated Feb. 6, 2018.
Written Opinion of the International Searching Authority for PCT/US2017/062561; dated Feb. 6, 2018.
R. Legenstein, et al. "Edge of Chaos and Prediction of Computational Performance for Neural Microcircuit Models," Neural Networks 20 (3), pp. 323-334, 2007.
W. Maass, "Liquid Computing", Proc. of the Conference CiE'07: Computability in Europe 2007, Siena (Italy), pp. 507-516.
R. Walden, "Analog-to-digital converter survey and analysis," IEEE J. Sel. Areas Commun., vol. 51, pp. 539-548, 1999.
Office Action 1 for U.S. Appl. No. 15/452,412, dated May 10, 2017.
Response to Office Action 1 for U.S. Appl. No. 15/452,412, dated Aug. 9, 2017.
Office Action 2 for U.S. Appl. No. 15/452,412, dated Nov. 14, 2017.
Response to Office Action 2 for U.S. Appl. No. 15/452,412, dated Feb. 13, 2018.
Office Action 3 for U.S. Appl. No. 15/452,412, dated Mar. 7, 2018.
Response to Office Action 3 for U.S. Appl. No. 15/452,412, dated Jun. 6, 2018.
Notice of Allowance for U.S. Appl. No. 15/452,412, dated Jul. 13, 2018.
Office Action 1 for U.S. Appl. No. 15/817,906, dated Feb. 23, 2018.
Response to Office Action 1 for U.S. Appl. No. 15/817,906, dated May 23, 2018.
Notice of Allowance for U.S. Appl. No. 15/817,906, dated Jul. 6, 2018.

* cited by examiner

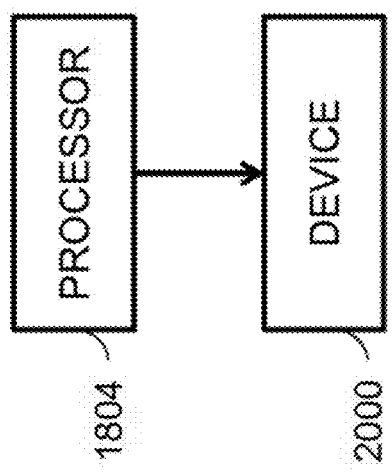

US 10,404,299 B1

SYSTEM FOR PARALLELIZED COGNITIVE SIGNAL DENOISING

CROSS-REFERENCE TO RELATED APPLICATIONS

This application is a Continuation-in-Part application of U.S. non-provisional application Ser. No. 15/452,412, filed on Mar. 7, 2017, which is a non-provisional application of U.S. Provisional Application No. 62/304,623, filed on Mar. 7, 2016, the entirety of which are hereby incorporated by reference.

This application is ALSO a Continuation-in-Part application of U.S. non-provisional application Ser. No. 15/631, 307, filed on Jun. 23, 2017, which is a non-provisional application of U.S. Provisional Application No. 62/379,634, filed on Aug. 25, 2016, the entirety of which is hereby incorporated by reference.

This application is ALSO a Continuation-in-Part application of U.S. non-provisional application Ser. No. 15/452, 155, filed Mar. 7, 2017, which is a non-provisional application of U.S. Provisional Application No. 62/304,623, filed on Mar. 7, 2016, the entirety of which are hereby incorporated by reference.

This application is ALSO a Continuation-in-Part application of U.S. non-provisional application Ser. No. 15/817, 906, filed Nov. 20, 2017, which is a non-provisional application of U.S. Provisional Application No. 62/447,883, filed on Jan. 18, 2017, the entirety of which is hereby incorporated by reference.

This application ALSO claims the benefit of and is a non-provisional patent application of U.S. Provisional Application No. 62/500,966, filed on May 3, 2017, the entirety of which is hereby incorporated by reference.

GOVERNMENT RIGHTS

This invention was made with government support under U.S. Government Contract Number N00014-12-C-0027. The government has certain rights in the invention.

BACKGROUND OF INVENTION

(1) Field of Invention

The present invention relates to a system for signal denoising and, more particularly, to a system for parallelized cognitive signal denoising.

(2) Description of Related Art

State-of-the-art systems for detecting, localizing, and classifying source emitters from passive RF antennas over an ultra-wide bandwidth (e.g., greater than 30 Ghz) require high rate analog-to-digital converters (ADC). Such high-rate ADCs are expensive and power hungry, and due to fundamental physical limits (such as the Walden curve (see Literature Reference No. 6 in the List of Incorporated Literature References)), are not capable of achieving the sampling rate needed to capture the ultra-wide bandwidth. To mitigate this, state-of-the-art Electronic Support Measure (ESM) systems either using spectrum sweeping (which is too slow to handle agile emitters) or a suite of digital channelizers, which have large size, weight, and power requirements. In addition, the detection, localization, and classification algorithm state-of-the-art ESM systems use are typically based on the fast Fourier transform, with high computational complexity and memory requirements that make it difficult to operate them in real-time over an ultra-wide bandwidth.

Conventional method for denoising methods fall into two categories: filter-based methods, and training-based approaches. Filter-based methods use filtering to smooth out noise from a signal, but are too simplistic to simultaneously maintain the low-frequency long-term trends of a signal while adapting to the high-frequency abrupt transitions. Alternatively, training-based methods rely on a "dictionary" that models the signals of interest. Such a dictionary must be trained in an offline process, and requires training data that may not be available. In addition, the dictionary often requires a large amount of memory and computation to be stored and leverage on the platform, making such approaches infeasible for ultra-low SWaP systems.

A few other systems use a reservoir computer to perform wideband signal denoising. Such systems were described in U.S. application Ser. No. 15/452,412, entitled, "Cognitive Architecture For Wideband, Low-Power, Real-Time Signal Denoising," and U.S. application Ser. No. 15/631,307, entitled, "A Neuromorphic Processor for Wideband Signal Analysis," the entirety of which are incorporated herein by reference. The reservoirs in the aforementioned systems use random connections between reservoir states, and as a result the number of multiplications required to compute reservoir dynamics scales quadratically with the number of reservoir nodes.

Thus, a continuing need exists for a signal denoising system that provides wideband signal denoising using a reservoir connectivity matrix that requires multiplications that scale linearly (as opposed to quadratically) with the number of reservoir nodes, and is thus far more efficient to implement in low SWaP hardware. Such a system would also desirably be useable to generate a real-time de-noised spectrogram of the input signal without using expensive channelizers or Fast Fourier Transforms (FFTs).

SUMMARY OF INVENTION

This disclosure is directed to a cognitive signal processor (CSP) for signal denoising. In operation, the CSP receives a noisy signal as a time-series of data points from a mixture of both noise and one or more desired waveform signals. The noisy signal is linearly mapped to reservoir states of a dynamical reservoir. A high-dimensional state-space representation is then generated of the noisy signal by combining the noisy signal with the reservoir states. A delay-embedded state signal is generated from the reservoir states. The reservoir states are denoised by removing noise from each reservoir state signal, resulting in a real-time denoised spectrogram of the noisy signal. A denoised waveform signal is generated combining the denoised reservoir states. Finally, and in various embodiments, the denoised waveform signal is rendered for display and displayed on a Display Device.

Additionally, the signal denoising process is implemented in software or digital hardware by converting the state-space representation of the dynamical reservoir to a system of delay difference equations and then applying a linear basis approximation.

In another aspect, the reservoir states are denoised by removing the noise from each reservoir state signal independently in parallel, resulting in a real-time denoised spectrogram of the noisy signal for further processing; and the denoised waveform signal is generated based on a weighted combination of the denoised reservoir states.

In yet another aspect, the dynamical reservoir includes, for each reservoir state, an error function that is used to create the denoised reservoir state, the error function being a difference between a current reservoir state signal and a delayed denoised reservoir state signal.

In another aspect, the error function updates weights used in generating the denoised reservoir states, the weights being updated with the error function based on gradient descent.

In another aspect, at least one of the denoised waveform signal and the real-time denoised spectrogram is displayed on a Display Device.

Additionally, the dynamical reservoir is a recurrent neural network with a plurality of nodes.

Further, the dynamical reservoir includes a connectivity matrix having a block diagonal structure;

In yet another aspect, the dynamical reservoir includes an output layer having a set of summing nodes, each summing node receiving a weighted output from each delay-embedded state signal and summing the weighted output to generate the denoised waveform signal.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The objects, features and advantages of the present invention will be apparent from the following detailed descriptions of the various aspects of the invention in conjunction with reference to the following drawings, where:

FIG. 20 is an illustration depicting an example device being controlled according to various embodiments of the present invention.

DETAILED DESCRIPTION

Figure 1:
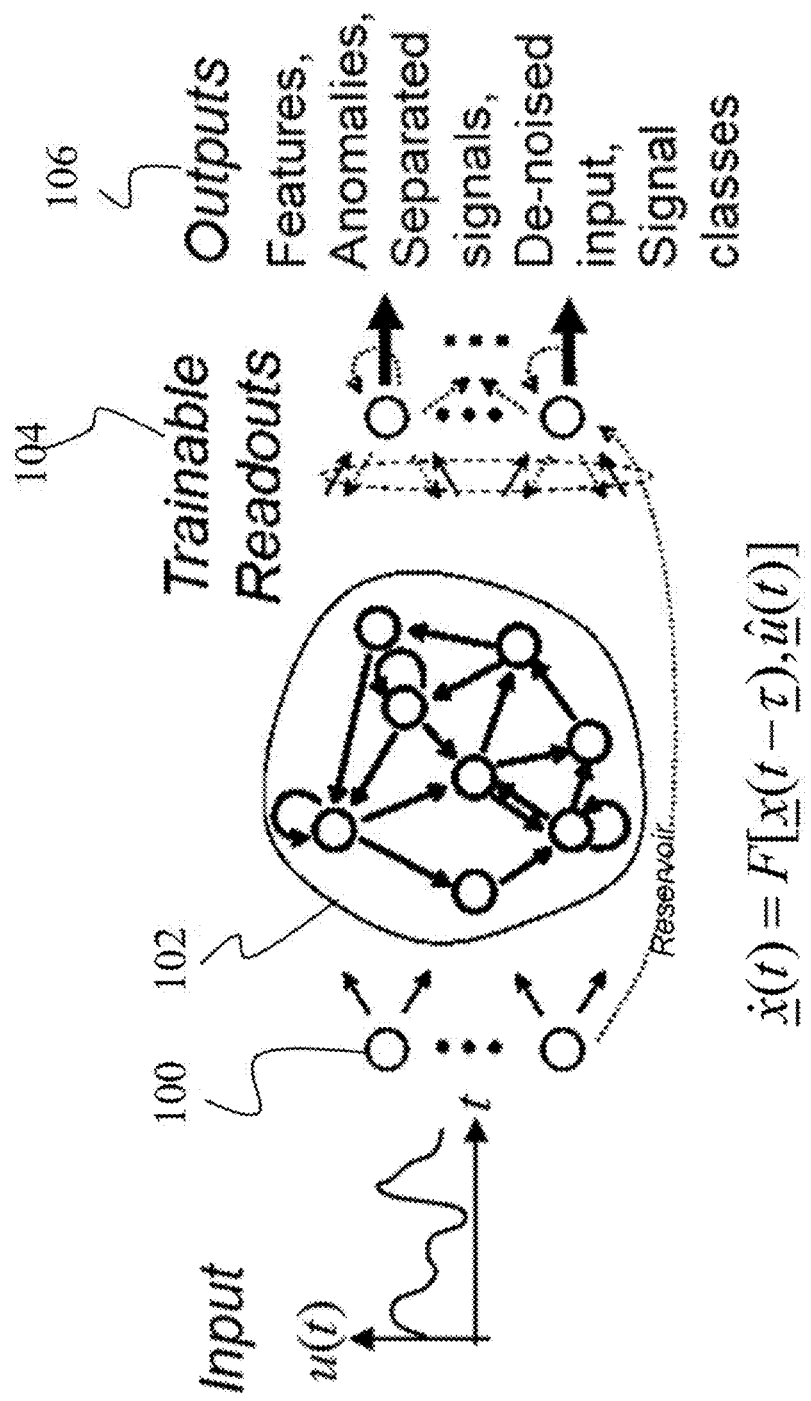
FIG. 1 is an illustration depicting a reservoir computer as mapping an input signal vector to a high-dimensional state-space.

The present invention relates to a system for signal denoising and, more particularly, to a system for parallelized cognitive signal denoising. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) List of Incorporated Literature References

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:
1. H. Jaeger, et al. "Harnessing nonlinearity: Predicting chaotic systems and saving energy in wireless communications," Science, vol. 304, no. 5667, pp. 78-80, 2004.
2. R. Legenstein, et al. "Edge of Chaos and Prediction of Computational Performance for Neural Microcircuit Models," Neural Networks, 20(3), 2007.
3. W. Maass, "Liquid Computing", Proc. of the Conference CiE'07: COMPUTABILITY IN EUROPE 2007, Siena (Italy), 2007.
4. F. Takens, "Detecting Strange Attractors in Turbulence," Dynamical Systems and Turbulence, Lecture Notes in Mathematics Vol. 898, 1981.
5. D. Verstraeten, et al. "An experimental unification of reservoir computing methods", Neural Networks, vol. 20, no. 3, April 2007.
6. R. Walden, "Analog-to-digital converter survey and analysis," IEEE J. Sel. Areas Commun., vol. 51, pp. 539-548, 1999.
7. H. Yap, et al., "A First Analysis of the Stability of Takens' Embedding," in Proc. of the IEEE Global Conference on Signal and Information Processing (GlobalSIP) symposium on Information Processing for Big Data, December 2014.

(2) Principal Aspects

Various embodiments of the invention include three "principal" aspects. The first is a system for parallelized cognitive signal denoising that, in various embodiments, is implemented as a cognitive signal processor. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

(3) Introduction

This disclosure provides a system for signal processing (or otherwise referred to as a "cognitive" signal processor (CSP)) that takes an input signal containing a mixture of pulse waveforms over a very large (e.g., >30 Ghz) bandwidth and denoises the input signal.

The CSP includes three primary components. The first component is a reservoir computer (RC), which is the cognitive-inspired aspect of the CSP. The dynamic reservoir computer maps an input signal to a high-dimensional dynamical system known as the reservoir. The reservoir connectivity weights are optimized for the task of signal denoising. The second component is a delay embedding that creates a finite temporal record of the values of the reservoir states. The third component is a weight adaptation module that adapts the output of the reservoir via gradient descent to produce a prediction of the input signal a small time-step in the future. Since the noise in the input signal is inherently random and unpredictable, the predicted input signal will be free of noise (i.e., denoised signal). The error between the predicted input signal and actual input is used by the weight adaptation module to further tune the output weights of the reservoir in an iterative process.

The invention of this disclosure exhibits at least five advantages in challenging denoising scenarios relative to current state-of-the-art methods, thereby dramatically improving the technology in signal processing. First, because the CSP performs adaptive filtering, its hardware-based embodiment requires much less weight and power than current brute-force channelization methods. Second, the CSP can cover an ultrawide bandwidth of over 30 GHz and yet still exhibit very low latencies on the order of 0.1 nanoseconds. Third, the CSP can perform this denoising operation using only a single input antenna. Fourth, the CSP is capable of denoising signals in real-time using a constraint that covers a wide range of electromagnetic and acoustic signals of interest. Many other current approaches use powerful, but computationally expensive constraints, such as signal complexity measures, or rely on loose constraints, such as filter banks, which may be less computationally expensive but have limited capacity to capture the structure of real-world source signals. In contrast, the CSP of the present disclosure utilizes the constraint that the waveforms of interest in a source signal can be linearly predicted over a short interval of time, which can be computed quickly with limited computational cost. Finally, in the deterministically designed reservoir, the reservoir states each correspond to the amount of input signal energy near a particular frequency. This enables the CSP to generate a real-time spectrogram of a complex input signal that can be implemented efficiently in hardware and generated a denoised waveform signal.

As can be appreciated by those skilled in the art, the system described herein has several applications. For example, the system can be used with Electronic Support Measures (ESM) receivers developed by Argon ST and with other systems on airborne platforms or any other application where it may be desirable to perform real-time processing of signals over an ultra-wide bandwidth. The CSP or system described herein provides expanded situational awareness, providing the core functionality required for ultra-low latency signal detection and analysis over a 30 Ghz instantaneous bandwidth to enable real-time resource allocation based on an RF environment. This performance can be achieved on computing platforms with orders of magnitude lower size, weight, and power.

The system is also applicable to vehicle (e.g., UAV, plane, car, boat, robot) or man-portable applications, such as rapid detection and separation of significant objects (e.g., obstacles, terrain, other vehicles, persons, animals) from clutter from radar antenna signals. As a non-limiting example, once the denoised waveform signal is generated, the sought-after or otherwise identified object can be located using imagery, triangulation or any other suitable technique, with assets then being deployed to the object's location. Such deployment can include causing an autonomous drone to physically maneuver above the object's location for surveillance purposes, etc.

As another example, in autonomous vehicle operation, cars or other vehicles may use radars to detect and avoid obstacles. Due to clutter, such as trees, other cars, and walls, the radar returns for obstacles may be weak relative to other returns within the spectrum and also obscured by them. In one aspect, the system described herein can be used to denoise radio frequency (RF) signals, such as those collected by radar receivers (e.g., antenna, sensors, etc.). Separation of significant object pulses from clutter pulses reduces the likelihood that the autonomous vehicle will be confused by clutter and can then effectively detect and avoid a significant object. For example, once a significant object is detected based on the denoised signal, the system can cause a vehicle to act (by being connected to an interfacing with an appropriate vehicle control system) based on the significant object, such as slowing, accelerating, stopping, turning, and/or otherwise maneuvering around the significant object. Other actions based on the obstacle are also possible, such as causing the vehicle to inform or warn a vehicle occupant and/or vehicle operator about the obstacle with an audible warning, a light, text, and/or an image, such as a radar display image. For further examples, the system may generate commands and control operations of vehicle systems that can be adjusted, such as vehicle suspension or safety systems such as airbags and seatbelts, etc. Yet another example application includes being used in vehicle manufacturing by helping to significantly denoise the control signal used for automated welding in the factory. Specific details regarding the CSP are provided below.

(4) Specific Details of Various Embodiments

As noted above, this disclosure provides system for parallelized cognitive signal denoised or a cognitive signal processor (CSP). The CSP includes three primary components. The first component is a reservoir computer (RC), which is the "neuromorphic" (brain-inspired) aspect of the signal denoising system. The reservoir computer accepts the mixture signals as input and maps it to a high-dimensional dynamical system known as the reservoir. The RC has a predefined number of outputs, which are generated by continually mapping the reservoir states through a set of distinct linear functions with one such function defined per output. The second component is a delay embedding. The reservoir state signals are continuously passed through the delay embedding, which creates a finite temporal record of the values of the reservoir state. The third component is a weight adaptation module that adapts the output of the reservoir via gradient descent to produce a prediction of the input signal a small time step in the future. Since the noise in the input signal is inherently random and unpredictable, the predicted input signal will be free of noise. The error between the predicted input signal and actual input is used by the weight adaptation module to further tune the output weights of the reservoir in an iterative process. Further details are provided below.

(4.1) Reservoir Computing

The cognitive signal denoising architecture is based on a form of neuromorphic (brain-inspired) signal processing known as reservoir computing or a reservoir computer (RC) (see Literature Reference Nos. 1, 2, and 3). As shown in FIG. 1, reservoir computing is a special form of a recurrent neural network (a neural network with feedback connections) that operates by projecting the input signal vector 100 into a high-dimensional reservoir state space 102 which contains an equivalent dynamical model of the signal generation process capturing all of the available and actionable information about the input. A reservoir has trainable readout layers 104 that can be trained, either off-line or on-line, to learn desired outputs by utilizing the state functions. The reservoir states can be mapped to useful outputs 106, including denoised inputs, signal classes, separated signals, and anomalies using the trainable linear readout layers 104. Thus, an RC has the power of recurrent neural networks to model non-stationary (time-varying) processes and phenomena, but with simple readout layers 104 and training algorithms that are both accurate and efficient.

Benchmark results in several application areas demonstrate the effectiveness of RCs. RCs have achieved orders of magnitude better performance that state-of-the-art methods for chaotic time series prediction, have outperformed hidden Markov model (HMM)-based speech recognition systems on small vocabulary, and perform better than conventional methods for digit recognition (see Literature Reference No. 5 for a description of digit recognition).

There is a strong connection between reservoir computing and state-space filtering. Conventional RF/microwave filters typically implement the Laplace domain filtering algorithm, as follows:

$$s\underline{x}(s) = \underline{A}\underline{x}(s) + \underline{B}u(s)$$

$$y(s) = \underline{C}^T\underline{x}(s) + Du(s),$$

where $\underline{x}(s)$, $u(s)$, and $y(s)$ are the state-space representations of the reservoir state, input signal, and output, respectively.

Figure 2:
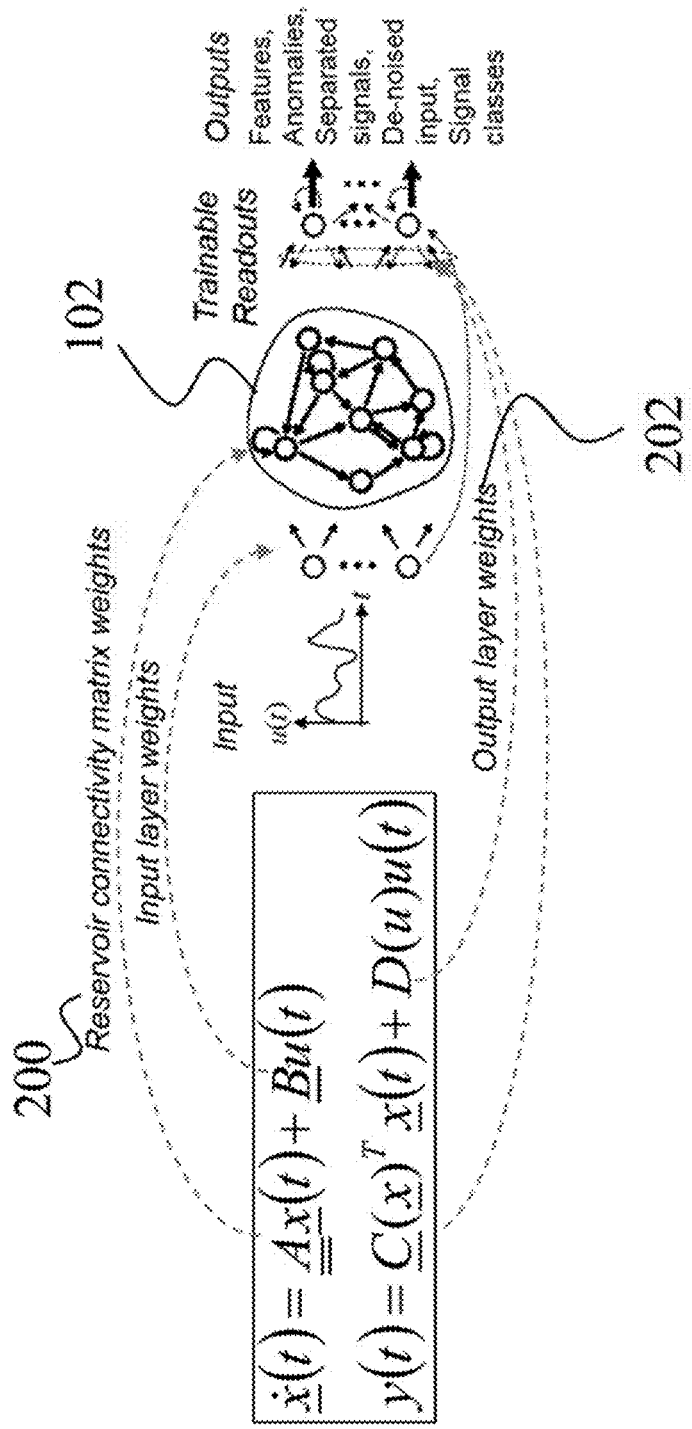
FIG. 2 is an illustration depicting a correspondence between state-space representation components and parameters in the reservoir computer.

A state space filter implements a time-domain filtering algorithm, and as shown in FIG. 2, the different components of the state-space representation 102 have a direct correspondence with different parameters in the reservoir computer. In particular, the reservoir connectivity matrix weights ($\underline{A}$) 200 determine the filter pole locations. Similarly the output layer weights ($\underline{C}$) 202 determine the filter zero locations. As the output layer weights 202 are adaptable, a reservoir computer can implement an adaptable (nonlinear) state-space filter.

(4.2) Hardware-Efficient Reservoir Design

In conventional reservoir computers, the weights in both the reservoir connectivity matrix ($\underline{A}$) and the input-to-reservoir mapping matrix ($\underline{B}$) are typically chosen randomly. As a nonlimiting example, the entries of $\underline{A}$ and $\underline{B}$ can independent, identically distributed samples from a zero-mean, unit variance Gaussian distribution. Such random reservoir weight matrices have been successfully used in many previous applications. However, to implement such a reservoir in low-power hardware (e.g., an FPGA or digital ASIC), the reservoir state update require computation proportional to the square of the number of nodes, which become infeasible as the number of reservoir node increases. For example, for a reservoir with 100 nodes, prior art reservoirs require 1000 multiplications per iteration of the reservoir, while the reservoir of the present disclosure requires only 200 multiplications per iteration.

Described below is a method to design the reservoir weight matrix ($\underline{A}$) such that the computation of the reservoir state scales linearly with the number of nodes, thus enabling efficient implementation in low-power hardware. This designed reservoir also has many other advantages over conventional random reservoirs. As shown in the experimental results, the reservoir of the present disclosure is better optimized for signal denoising than random reservoirs, increasing the SNR of the denoised signal. In addition, the states of a random reservoir are essentially meaningless in isolation and can only be made useful when combined with the learned output layer mixing weights. However, in the reservoir of the present disclosure, each reservoir state measures the amount of signal energy near a particular resonant frequency. This enables the reservoir states to be used as a real-time spectrogram that is implemented without having to use a computationally intensive process such as the Fast Fourier Transform. For further understanding, the reservoir described herein is demonstrated in the Experimental Results section to create a real-time spectrogram.

To mathematically derive the RC output layer iteration adaptations that are used to implement the optimized denoising algorithm, the linear state space described by the equations in FIG. 2 is utilized. For A and B independent of the input and state space vector, the formal solution of the state equation is given by:

$$x(t) = e^{At}\left[x(0) + \int_0^t ds\, e^{-As}Bu(s)\right],$$

which can be verified by time-differentiating both sides of the equation. Here, $e^{At}$ is a matrix exponential and the time integral is over a matrix quantity. An important point to note is that the initial time in the formal solution is arbitrary (up to causality, of course); thus, for any $\tau > 0$:

$$x(t_i + \tau) e^{A\tau}\left[x(t_i) + \int_{t_i}^{t_i+\tau} ds\, e^{As}Bu(s)\right].$$

Given the state space vector at some time $t_i$, along with the system parameters A and B and input signal $u(t_i + \Delta t)$ over the interval of interest $0 \leq \Delta t \leq \tau$, all future values of the state space vector at $t + \Delta t$ can be computed. This form naturally lends itself to parallel computation in a discretized form, and is the basis for the optimized de-noising algorithm.

Before describing the optimized de-noising algorithm, several observations are made about the linear state space system that enable significant simplifications in the implementation of the algorithm. As stated earlier, the matrix A must be real; additionally, when describing a passive IIR filter, the matrix A has eigenvalues (poles of the filter) that are either purely real and negative corresponding to purely damped modes, or eigenvalues that come in complex conjugate pairs, with negative real parts to the eigenvalues. This observation allows the matrix A to be put into a purely real block-diagonal form with a real block-diagonalizing similarity transform. The block-diagonalized matrix $SAS^{-1}$ has the form:

$$SAS^{-1} = \begin{pmatrix} \lambda_{r,1} & \lambda_{i,1} & 0 & 0 & 0 & \cdots & 0 & 0 \\ -\lambda_{i,1} & \lambda_{r,1} & 0 & 0 & 0 & \cdots & 0 & 0 \\ 0 & 0 & \lambda_{r,2} & \lambda_{i,2} & 0 & \cdots & 0 & 0 \\ 0 & 0 & -\lambda_{i,2} & \lambda_{r,2} & 0 & \cdots & 0 & 0 \\ 0 & 0 & 0 & 0 & \ddots & \ddots & \vdots & \vdots \\ \vdots & \vdots & \vdots & \vdots & \ddots & \ddots & 0 & 0 \\ 0 & 0 & 0 & 0 & \cdots & 0 & \lambda_{r,n} & \lambda_{i,n} \\ 0 & 0 & 0 & 0 & \cdots & 0 & -\lambda_{i,n} & \lambda_{r,n} \end{pmatrix}$$

Here n is the number of complex conjugate poles, with $N = 2n$; including purely damped poles as well introduces purely diagonal eigenvalues into the canonical form (system matrices A with only complex conjugate pair poles were used). Because any state space system can be converted to a system with block diagonal A by similarity transforms on $x(t)$, B, and C, it is assumed in the following that A is block diagonal.

Further, examine the state space system in the Laplace domain. The block diagonal form provides:

$$\hat{y}(s) =$$

$$\sum_{j=1}^{n} \frac{(B_{2j-1}C_{2j-1} + B_{2j}C_{2j})(s - \lambda_{r,j}) + \lambda_{i,j}(B_{2j-1}C_{2j} - B_{2j}C_{2j-1})}{\lambda_{i,j}^2 + (s - \lambda_{r,j})^2} \hat{\mu}(s) +$$

$$D\hat{u}(s)$$

where overhats denote Laplace domain quantities. Notice that the combination of B and C entries in the numerator in the sum contribute to only two independent quantities for each j. For each block-diagonal subspace, or equivalently, each oscillator, the contribution to the response has four independent degrees of freedom (two components each of B and C) and two constraints. This allows the system to fix all components of B to be 1, and control the transfer function with only modifications to C.

For denoising applications, the denoised signal can be reconstructed using the response of the state system to delayed copies of the input signal u(t). Following the analysis of the previous paragraph, all delays on the input signal u(t) can be converted to delays on the state space vector x(t). With $N_d$ delays on the input signal, with basic delay τ, the Laplace domain response is as follows:

$$\hat{y}(s) = \sum_{j=1}^{n} \sum_{m=0}^{N_d-1} \frac{(B_{2j-1}^{(m)} C_{2j-1} + B_{2j}^{(m)} C_{2j})(s - \lambda_{r,j}) + \lambda_{i,j}(B_{2j-1}^{(m)} C_{2j} - B_{2j}^{(m)} C_{2j-1})}{\lambda_{i,j}^2 + (s - \lambda_{r,j})^2}$$
$$e^{-sm\tau} \hat{u}(s) + D\hat{u}(s).$$

On the other hand, a system with $N_d$ delays on the state space vector has Laplace domain response as follows:

$$\hat{y}(s) = \sum_{j=1}^{n} \sum_{m=0}^{N_d-1} \frac{(B_{2j-1} C_{2j-1}^{(m)} + B_{2j} C_{2j}^{(m)})(s - \lambda_{r,j}) + \lambda_{i,j}(B_{2j-1} C_{2j}^{(m)} - B_{2j} C_{2j-1}^{(m)})}{\lambda_{i,j}^2 + (s - \lambda_{r,j})^2}$$
$$e^{-sm\tau} \hat{u}(s) + D\hat{u}(s).$$

The state space delayed response can be made exactly the same as the input signal delayed response by the following identifications: $B_{2j-1} = C_{2j}$, $B_{2j} = C_{2j-1}$, $C_{2j}^{(m)} = B_{2j-1}^{(m)}$, $C_{2j-1}^{(m)} = B_{2j}^{(m)}$. It is assumed in the following that all delays in the system are to the state space vector x(t).

Implementation of the state space system on low-power hardware such as FPGAs requires not only discretization of the associated system equations, but proper normalization for the state space vector. Consider a single 2×2 sub-block of the block-diagonalized linear state space system. The response to a time-harmonic input signal in a 2×2 sub-block can be computed analytically, with the asymptotic response to an input signal with angular frequency ω given by $$x_{\pm,A}(\omega) = \sqrt{\frac{(\lambda_i \pm \lambda_r)^2 + \omega^2}{\lambda_i^4 + 2\lambda_i^2(\lambda_r^2 - \omega^2) + (\lambda_r^2 + \omega^2)^2}}.$$

This form assumes that the B entries for the sub-block have been set to 1, in accordance with the comments above. The maximum response value can be determined by differentiating this expression with respect to ω, and solving for the input signal frequency giving zero derivative. Assuming that the damping is small, i.e., $\lambda_r$ is small, to lowest order the maximum response is at the resonant frequency $\omega = \lambda_i$. Thus, each state space component can be properly normalized so that its response never exceeds a given value.

(4.3) Delay Embedding of Reservoir State

Figure 3:
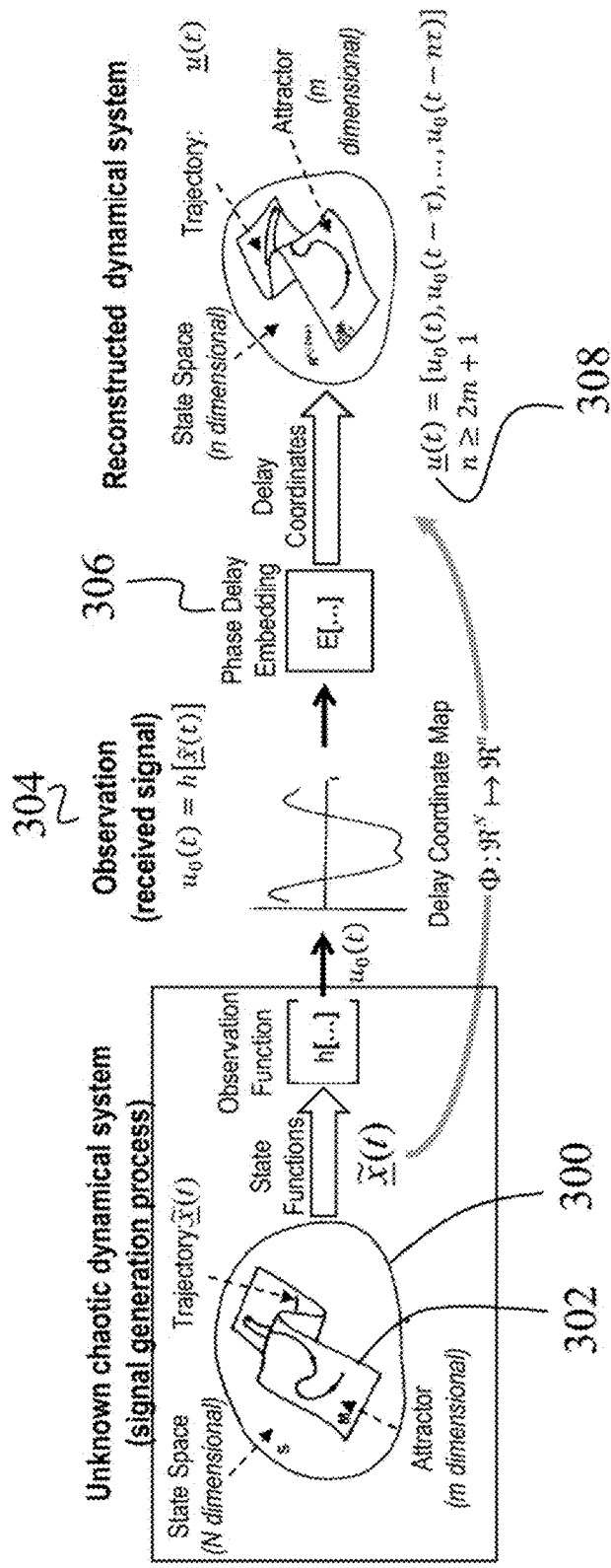
FIG. 3 is an illustration depicting a reconstruction of topology and geometry of an unknown (chaotic) dynamical system from a sufficient number of delayed observations.

Phase delay embedding is a technique developed in dynamical system theory to model the dynamics of a chaotic system from its observation $u_0(t)$ using delayed versions of the observation as new input vector u(t). As shown in FIG. 3, suppose that an unknown (potentially chaotic) dynamical system embedded in an N-dimensional state space 300 has an m-dimensional attractor 302.

According to Taken's embedding theorem (see Literature Reference No. 4) and Yap et al. (see Literature Reference No. 7), the topology and geometry of an unknown (chaotic) dynamical system can be reconstructed from a sufficient number of delayed observations. This means that though the state space 300 has N parameters, signals from the dynamical system form trajectories that all lie on an m-dimensional sub-manifold M of the state space 300, and can theoretically (though not practically) be specified by as few as m parameters. The observations (received signal) $u_0(t) = h[\underline{x}(t)]$ 304 is a projection of the state space 300. The phase delay embedding 306 produces a new input vector u(t) 308 from n delayed versions of the observation signal $u_0$ (t) concatenated together. According to Taken's theorem (see Literature Reference No. 4), given fairly broad assumptions on the curvature of the sub-manifold M and the nondegenerate nature of the projection h[•], if the number of delay coordinate dimensionality n>2m+1, then the phase delay embedding u(t) preserves the topological structure (i.e., shape) of the dynamical system, and thus can be used reconstruct the dynamical system from observations. More recent work by Yap et al (see Literature Refernece No. 7) shows that the delay coordinate dimensionality can be increased more (but still not a function of the ambient dimensionality N) to be able to preserve both the topology and geometry of the dynamical system, without complete knowledge of the dynamical system or the observation function.

In previous RC-based denoising systems, such as those described in U.S. application Ser. No. 15/452,412, and U.S. application Ser. No. 15/631,307 (the entirety of which are incorporated herein by reference), a dynamic reservoir was constructed by applying a delay embedding to the input signal and then sending the delay-embedded input into the reservoir.

Figure 4:
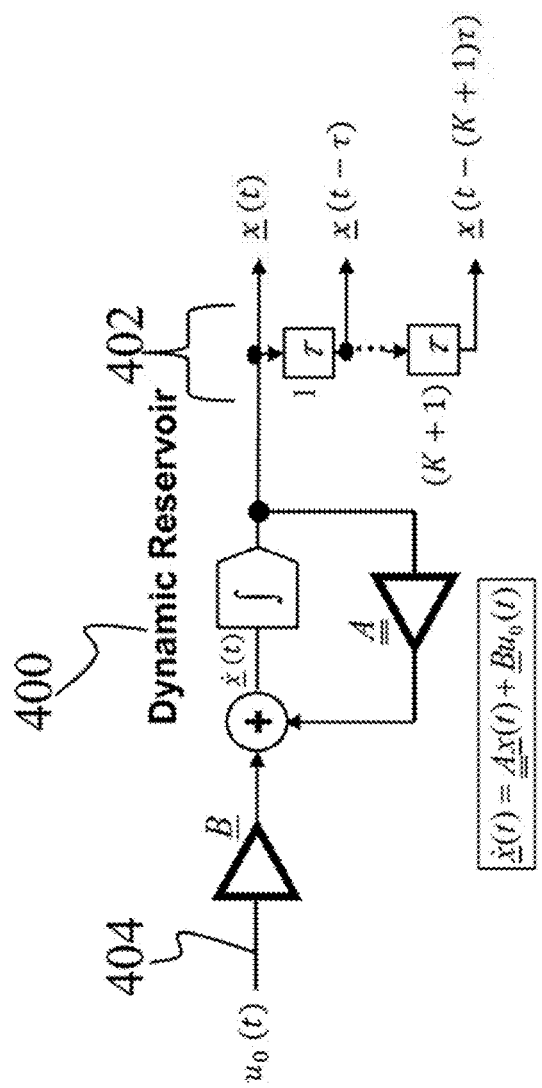
FIG. 4 is an illustration depicting a dynamic reservoir applying delay embedding to reservoir states to provide a time history of reservoir dynamics according to some embodiments of the present disclosure.

As shown in FIG. 4, the dynamic reservoir 400 according to the various embodiments of the present invention applies a delay embedding 402 to the reservoir states to provide a time history of reservoir dynamics. As shown, the 402 delay-embedding is applied to each of the reservoir states instead of to the input signal 404. This provides three key benefits. First, time delays and adaptation are only required at the output of the reservoir, rather than at the input. Second, having a temporal record of the states provides more useful information for signal analysis than a temporal record of the raw signal input. Third when combined with the designed reservoir states, delay-embedded states enable each state to be denoised separately, which can be used to generate a denoised spectrogram of the input signal.

As shown, the dynamic reservoir 400 with delay embedded inputs can be converted to an equivalent dynamic reservoir with delay-embedded states that is governed by the same dynamical system. A dynamic reservoir with delay-embedded inputs, delay embedding size $N_d$, and delay parameter τ is modeled by the following dynamical system equations:

$$\dot{x}(t) = Ax(t) + \sum_{m=0}^{N_d-1} \beta_m u(t - m\tau)$$

$$y(t) = Cx(t) + Du(t).$$

In the Laplace domain, the output $\hat{y}(s)$ is given by:

$$\hat{y}(s) = \sum_{m=0}^{N_d-1} C(s-A)^{-1}\beta_m e^{-sm\tau}\hat{u}(s) + D\hat{u}(s).$$

The dynamic reservoir with same parameters and delay-embedded states has the following dynamical system equations:

$$\dot{x}(t) = Ax(t) + \beta u(t)$$

$$y(t) = \sum_{m=0}^{N_d-1} \chi_m x(t-m\tau) + Du(t),$$

which has Laplace domain output $\hat{y}(s)$:

$$\hat{y}(s) = \sum_{m=0}^{N_d-1} e^{-sm\tau}\chi_m (s-A)^{-1} B\hat{u}(s) + D\hat{u}(s).$$

Figure 5B:
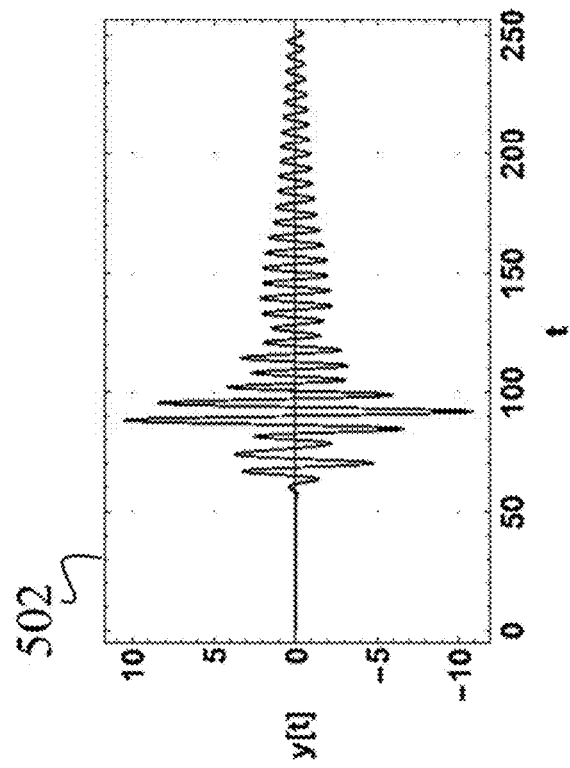
FIG. 5B is a plot graph depicting a response of a 10-pole Chebyshev filter to a single tone excitation with a Gaussian envelope and 20 quarter wavelength delays on state x.
Figure 5A:
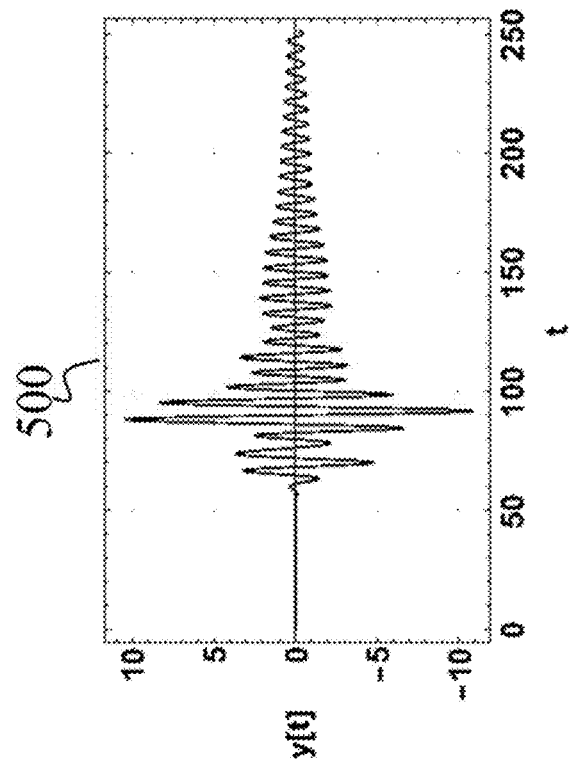
FIG. 5A is a plot graph depicting a response of a 10-pole Chebyshev filter to a single tone excitation with a Gaussian envelope and 20 quarter wavelength delays on an input signal.

The two state space systems can be made equivalent by setting $C=e^{-sm\tau}\chi_m(s-A)^{-1}$ and $B=\beta_m e^{-m\tau}$. FIGS. 5A and 5B show the response of two dynamical systems with delay-embedded input 500 and states 502, respectively, that have the same response to an example input (a single tone excitation with Gaussian envelope and 20 quarter wavelength delays).

(4.4) Real-Time Spectrogram Using Reservoir States

In a conventional reservoir with randomized connection weights, the individual reservoir states have no intrinsic meaning, and can only be used by learning output layer mixing weights that combine all the reservoir states to perform a relevant application, such as signal classification. In the reservoir according to various embodiments of the present invention, the reservoir states each correspond to the amount of energy of a particular narrow frequency band. In other words, the set of reservoir states can be interpreted as the output of a bank of narrow bandwidth 1-pole IIR filters. This state output is noisy because of noise present in the input signal and also because individual filters do not have a sharp transition band causing filters with neighboring center frequencies have some overlap. However, because the present system couples the designed reservoir with delay-embedded states, the delay embedding can be leveraged to perform prediction of individual states and use the prediction to denoised the states (the denoising algorithms and architecture are described in further detail below). The result is a clean spectrogram of the input signal that is obtained in real-time without the use of computationally expensive techniques such as channelizers or the Fast Fourier Transform. This spectrogram can be used for a variety of real-time signal analysis task, as detection, separation, and tracking of individual radar pulses within an input wideband signal mixture. Non-limiting examples of blind source separation systems that could lever the spectrogram output of the present disclosure include U.S. application Ser. No. 15/452,412, and U.S. application Ser. No. 15/452,155, both of which are incorporated by reference as though fully set forth herein. The spectrogram output is demonstrated on synthetic and real wideband signals in the Reduction to Practice section below.

(4.5) Architectures for Cognitive Signal Denoising Systems

Described below are examples of CSP architectures that can implement signal denoising algorithms in hardware. Given that the 1) delay embedded observations can effectively model dynamical system behavior and 2) reservoirs with delay-embedded state can be designed to have the same behavior as reservoirs with delay-embedded inputs, the process described herein leverages the time history of these reservoir state variables to perform short-term predictions of the observations. The present system uses a reservoir computer to learn the prediction function F:

$$\tilde{u}_o(t+\tau)=F[u_0(t)].$$

Figure 6:
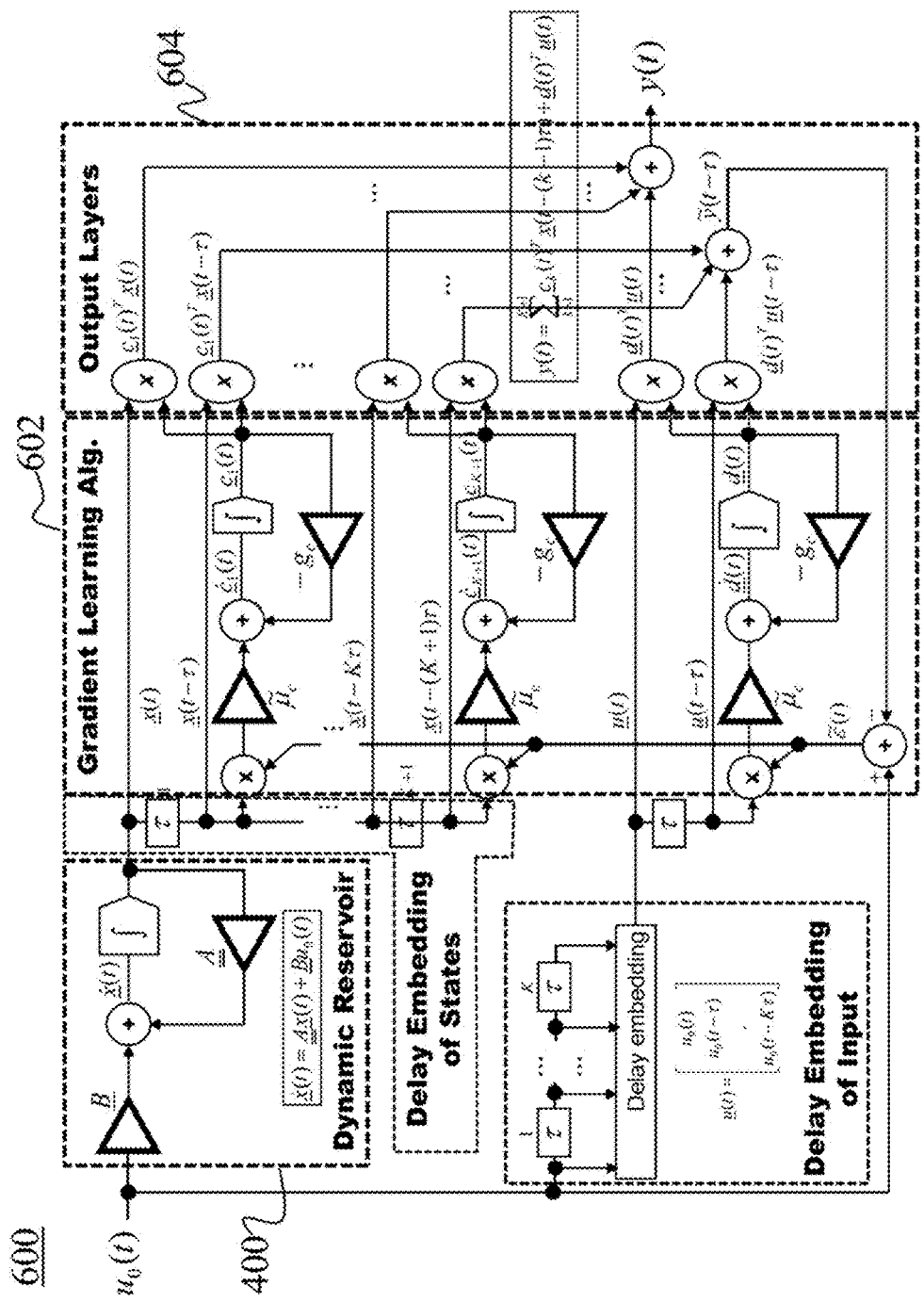
FIG. 6 is an illustration depicting a continuous time architecture for a cognitive signal processor according to some embodiments of the present invention.

FIG. 6 depicts the continuous time architecture 600 of the CSP as used for wideband signal denoising. A wideband ADC frontend provides input to the dynamic reservoir 400 (see FIG. 4), whose output layer weights are adapted based on short-time prediction to de-noise the input signal.

The model shows the dynamic reservoir 400 with fixed connections ($\underline{A}$) and adaptable output layers attached to it. A wideband (~30 GHz) frontend provide input to the dynamic reservoir. The weights of the output layers 604 are adapted via the gradient learning algorithm 602 described below. The gradient descent learning algorithm 602 is based on short-time prediction of the input signal. That is, the weights of the output layers 604 are adapted to make the best prediction of the input signal a short step $\tau$ in the future using a weighted combination of the delay-embedded states (which encodes the time history of reservoir state dynamics) and optionally, the delay embedding of the input signal (which encodes the time history of the input signal). Since noise is random and unpredictable, the predicted signal $y(t)=\tilde{u}_o(t+\tau)$ will be free of noise.

The dynamic reservoir in FIG. 4 satisfies the following set of coupled ordinary differential equations (ODE):

$$\underline{\dot{x}}(t)=\underline{A}\underline{x}(t)+\underline{B}u_0(t)$$

$$y(t) = \sum_{k=1}^{K+1} \underline{c}_k(t)^T \underline{x}(t-(k-1)\tau) + \underline{d}(t)^T \underline{u}(t),$$

where $\underline{u}(t)=[u_0(t), u_0(t-\tau), \ldots, u_0(t-K\tau)]^T$.

To perform short-time prediction of the input signal, the system of the present disclosure uses the online gradient descent algorithm 602. The idea is to enforce exact prediction of the current time point that is used in the delay embedding. The predicted input value at time $(t+\tau)$ is calculated from the current value the of the output weights ($\underline{c}_k(t), \underline{d}(t)$) and the current and past values of the states ($\underline{x}$) and the input ($u$). The quadratic error function to be minimized is given by:

$$E[\underline{c}_1,\ldots,\underline{c}_{K+1},\underline{d}] \doteq [u_0(t)-\hat{y}(t-\tau)]^2 + \lambda_c \sum_{k=1}^{K+1}\|\underline{c}_k(t)\|^2 + \lambda_d\|\underline{d}(t)\|^2,$$

where $\lambda_c$ and $\lambda_d$ are parameters that weight the importance of the output weights $$\{\underline{c}_k\}_{k=1}^{K+1}$$

and d, and $$\tilde{y}(t-\tau) = \sum_{k=1}^{K+1} \underline{c}_k(t)^T \underline{x}(t-k\tau) + \underline{d}(t)^T \underline{u}(t-\tau).$$

Note that $\tilde{y}(t-\tau)$ is the delayed output expressed by the delayed valued of $\underline{x}$ and $u$ and the current values of the output weights $\{\underline{c}_k\}_{k=1}^{K+1}$ and $\underline{d}$, and thus is general $\tilde{y}(t-\tau) \neq y(t-\tau)$. However, this approximation is reasonable, and allows the system to not require storage of time histories of output weights, facilitating more efficient hardware implementation.

To minimize the quadratic error $E[\underline{c}_1, \ldots, \underline{c}_{K+1}, \underline{d}]$, the system determines the gradients of $E[\underline{c}_1, \ldots, \underline{c}_{K+1}, \underline{d}]$ with respect to $$\{\underline{c}_k\}_{k=1}^{K+1}$$

and $\underline{d}$. Based on these gradients, the weight updates to $$\{\underline{c}_k(t)\}_{k=1}^{K+1}$$

and $\underline{d}(t)$ satisfy the following ODEs:

$$\underline{\dot{c}}_k(t) = -g_c \underline{c}_k(t) + \mu_c \tilde{\varepsilon}(t)\underline{x}(t-k\tau), \quad k = 1, 2, \ldots, K+1$$

$$\underline{\dot{d}}(t) = -g_d \underline{d}(t) + \mu_d \tilde{\varepsilon}(t)\underline{u}(t-\tau),$$

where $g_c = 2\lambda_d$ and $g_d = 2\lambda_d$ is the "forgetting" rates with respect to $$\{\underline{c}_k\}_{k=1}^{K+1}$$

and $\underline{d}$, $\mu_c$ and $\mu_d$ are the learning rates with respect to $$\{\underline{c}_k\}_{k=1}^{K+1}$$

and $\underline{d}$, and $\tilde{\varepsilon}(t) = u_0(t) - \tilde{y}(t-\tau)$ is the error signal.

The ODEs for the dynamic reservoir and the weight adaptation system can be implemented directly in analog hardware. To implement the above ODEs in software or efficient digital hardware (e.g., field-programmable gate arrays (FPGAs) or custom digital application-specific integrated circuits (ASICs)), the update equations must be discretized.

To implement the process of the present disclosure in software or digital hardware, the ODEs are converted to delay difference equations (DDEs). For a linear dynamical system with the state-space representation:

$$\underline{\dot{x}}(t) = \underline{A}\underline{x}(t) + \underline{B}(u)t$$

$$y(t) = \underline{C}(t)^T \underline{x}(t) + D(t)u(t).$$

Given the discrete time-step size $\tau$, the equivalent DDE that describes the exact same filter dynamics is as follows:

$$\underline{x}(t) = e^{\underline{A}\tau}\underline{x}(t-\tau) + \int_{t-\tau}^{t} e^{\underline{A}(t-s)} u(s) ds \cdot \underline{B}$$

$$y(t) = \underline{C}(t)^T \underline{x}(t) + D(t)u(t).$$

Figure 7A:
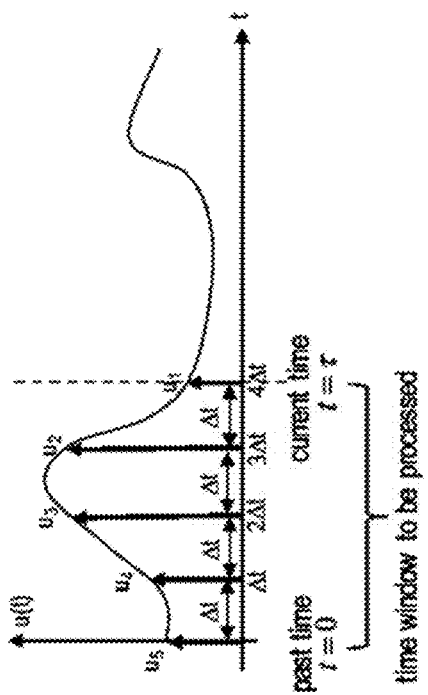
FIG. 7A is a chart depicting approximation of the input signal u(t), with uniformly sampled u(t) with sampling period Δt.
Figure 7B:
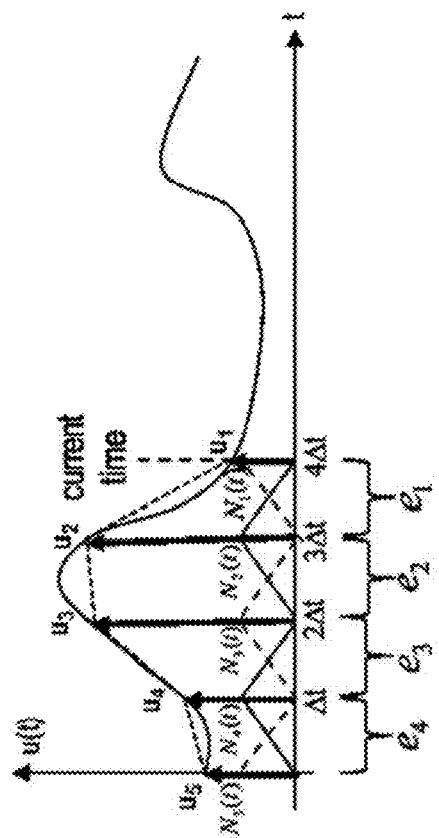
FIG. 7B is a chart depicting approximation of the input signal u(t), using Linear basis functions for approximating u(t)

This shows that the current reservoir state $\underline{x}(t)$ is a function of the reservoir state at the previous time step $\underline{x}(t-\tau)$ and the input signal $u(t)$ over the interval $[t-\tau, t]$. Since the entire continuous interval is not available in software or digital hardware, in the digital CSP, $u(t)$ is approximated over the interval using linear basis functions. Given the sampling period $\Delta t$, $u(t)$ a set of samples $u_i \overset{def}{=} u(t-(i-1)\Delta t)$, $1 \leq i \leq n_e + 1$ are collected, where $n_e = \tau/\Delta t$ in the number of sampling intervals within the time window defined by $\tau$ (see FIG. 7A). As seen in FIG. 7B, the input signal is approximated from the samples as $$u(t) \approx \sum_{i=1}^{n_e+1} u_i N_i(t),$$

where $N_i(t) = T(t-(i-1)\Delta t)$ is a shifted version of the triangle function $$T(t): T(t) = \begin{cases} 1 - t/\Delta t & 0 \leq t \leq \Delta t \\ 1 + t/\Delta t & -\Delta t \leq t \leq 0 \\ 0 & \text{otherwise} \end{cases}$$

Based on the linear basis approximation, the DDE for the reservoir state $\underline{x}(t)$ becomes $$\underline{x}(t) = e^{\underline{A}\tau}\underline{x}(t-\tau) + \sum_{i=1}^{n_e+1} \left\{ u_i \int_{t-\tau}^{t} e^{\underline{A}(t-s)} N_i(s) ds \cdot \underline{B} \right\}$$

Without loss of generality, $t=\tau$. Defining the two auxiliary matrices $\underline{B}_{1e}^i$ and $\underline{B}_{2e}^i$ $$\underline{B}_{1e}^i \overset{def}{=} e^{\underline{A}(i-1)\Delta t} \int_0^\tau e^{\underline{A}(\tau-s)} N_1(s) ds \cdot \underline{B} = \frac{e^{\underline{A}(i-1)\Delta t}}{\Delta t} \underline{A}^{-2}\left(e^{\underline{A}\Delta t} - \Delta t \underline{A} - I\right)\underline{B}$$

$$\underline{B}_{2e}^i \overset{def}{=} e^{\underline{A}(i-1)\Delta t} \int_0^\tau e^{\underline{A}(\tau-s)} N_2(s) ds \cdot \underline{B} =$$

$$e^{\underline{A}(i-1)\Delta t}\left\{\underline{A}^{-1}\left(e^{\underline{A}\Delta t} - I\right) - \frac{1}{\Delta t}\underline{A}^{-2}\left(e^{\underline{A}\Delta t} - \Delta t \underline{A} - I\right)\right\}B,$$

then $\dot{x}(\tau)$ can be computed as:

$$x(t) = x(n_e \Delta t) =$$

$$\underbrace{e^{\underline{A}\tau}\underline{x}(0)}_{\tilde{A}} + \underbrace{\left[\underline{B}_{1e}^1, (\underline{B}_{2e}^1 + \underline{B}_{1e}^2), \ldots, (\underline{B}_{2e}^{n_e-1} + \underline{B}_{1e}^{n_e}), \underline{B}_{2e}^{n_e}\right]}_{B} \begin{bmatrix} u_1 \\ u_2 \\ \vdots \\ u_{n_e} \\ u_{n_e+1} \end{bmatrix}$$

Figure 8:
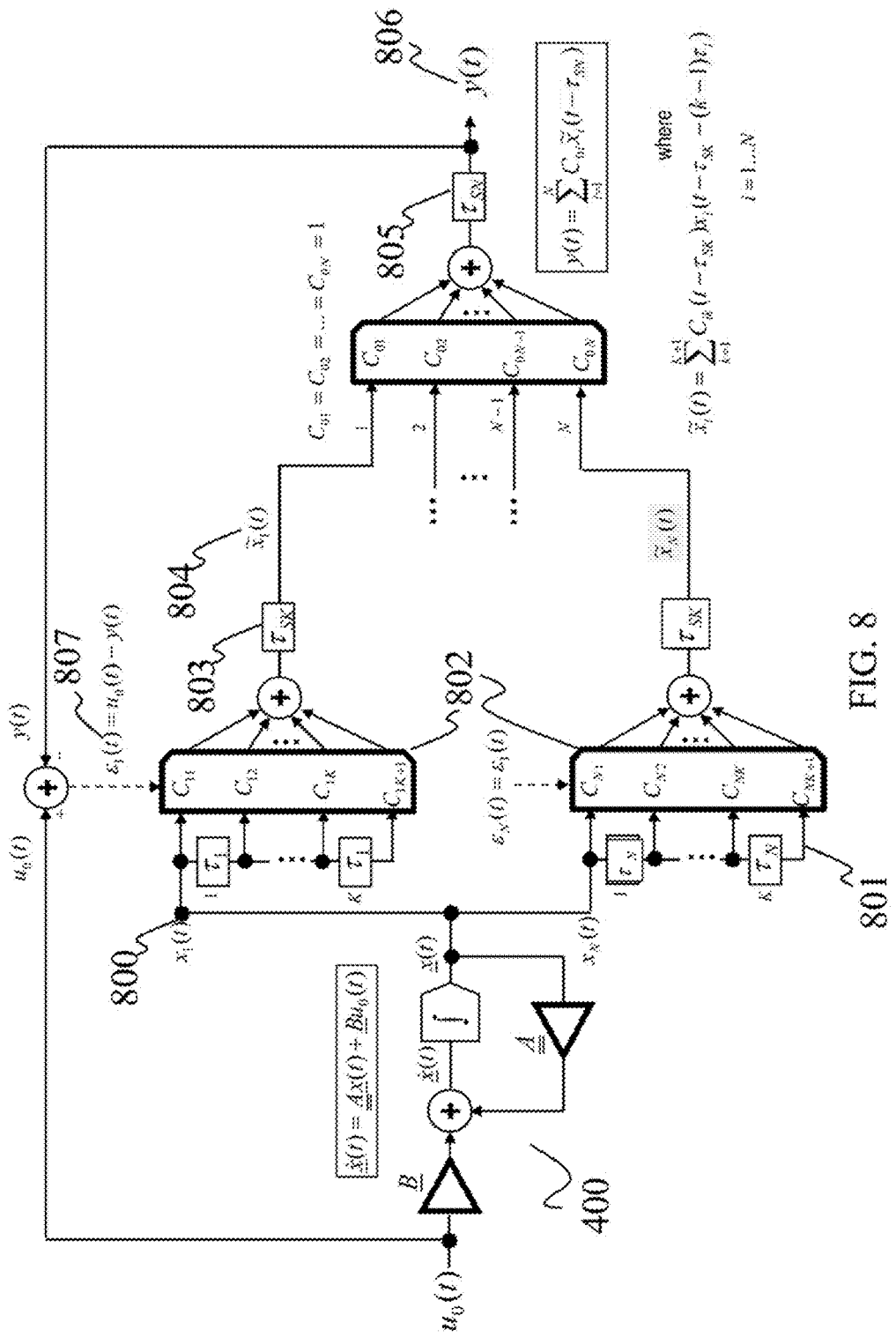
FIG. 8 is an illustration depicting a version of the cognitive signal processor architecture that uses global feedback of the output signal y(t) to adapt the mixing weights $C_{ik}$, for $1 \le i \le N$ and, $1 \le k \le K+1$.

Based on the above, derive iterative updates are derived for the state ($\dot{x}$), output ($y$), and weights $(\{c_k\}_{k=1}^{K+1}, d)$, which are summarized in Algorithm 1 below:
Algorithm 1: Iterative Algorithm for General Discrete Time Model
Initialization:

$\underline{x}[1]=\underline{0}, \underline{c}_k[1]=\underline{0}, \underline{d}[1]=\underline{0}\ k=1,2,\ldots,(K+1)$ Iteration (n≥2):

$\underline{u}[n] = [u_0[n], u_0[n-N_\tau], \ldots, u_0[n-KN_\tau]]^T$ $\underline{x}[n] = \underline{\tilde{A}}\underline{x}[n-1] + \underline{\tilde{B}}u_0[n]$ $\tilde{\varepsilon}[n] = u_0[n] - \sum_{k=1}^{K+1} \underline{c}_k[n-1]^T \underline{x}[n-kN_\tau] + \underline{d}[n-1]^T \underline{u}[n-N_\tau]$ $\underline{c}_k[n] = (1 - \Delta t g_c)\underline{c}_k[n-1] + \Delta t \tilde{\mu}_c \tilde{\varepsilon}[n]\underline{x}[n-kN_\tau]\ k=1,2,\ldots,(K+1)$ $\underline{d}[n] = (1 - \Delta t g_d)\underline{d}[n-1] + \Delta t \tilde{\mu}_d \tilde{\varepsilon}[n]\underline{u}[n-N_\tau]$ $y[n] = \sum_{k=1}^{K+1} \underline{c}_k[n]^T \underline{x}[n-(k-1)N_\tau] + \underline{d}[n]^T \underline{u}[n]$ The architecture for a system implementing the above iteration is shown in FIG. 8. It is a discretized model of the continuous time model shown in FIG. 6. Specifically, FIG. 8 illustrates how our cognitive signal denoising architecture de-noises an input signal $u_0(t)$ to produce an output signal $y(t)$. The input signal $u_0(t)$ is sent into the dynamic reservoir 400. At each time step, the dynamic reservoir state $x(t)$ is the sum of the previous reservoir state multiplied by the transition matrix A and the input signal multiplied by the input-to-reservoir mapping matrix B. The reservoir state vector $x(t)$ is then split into individual elements 800 $x_1(t), \ldots, x_N(t)$, and for each reservoir state element 800 $x_i(t)$, a time history of its dynamics is created by applying a length-K delay embedding. The delay embedded reservoir state elements 801 $x_i(t), x_i(t-\tau_i), \ldots, x_i(t-K\tau_i)$ are multiplied by tunable output weights 802 $C_{i1}, \ldots, C_{i(K+1)}$, summed together and delayed by time delay 803 $\tau_{SK}$ to obtain denoised reservoir state element 804 $\tilde{x}_i(t)$. The denoised reservoir state elements are them summed together, and delayed bytime delay 805 $\tau_{SN}$ to obtain the denoised output signal 806 $y(t)$. Alternatively, one can apply a weighted sum via the fixed coefficients $C_{01}, \ldots, C_{0(K+1)}$ to the de-noised reservoir state elements, although this is not done in our reduction to practice. The error signal 807 $\varepsilon(t)$ is constructed by subtracting the input signal 404 $u_0(t)$ from the output signal 806 $y(t)$, and this error signal is used to update the output weights 802 $C_{ij}$, $1 \leq i \leq N$, $1 \leq j \leq K+1$. In our reduction to practice, the same error signal is used to update each set of output weights, but in an alternate implementation the error signals could be varied for each reservoir state element (for example, based on the different delay sizes $\tau_i$).

The discretized architecture is amenable to implementation on an FPGA or custom digital ASIC. A software simulation of the architecture shown in FIG. 8 was developed in order to evaluate the performance of the invention on both synthetic and real wideband signals containing mixtures of radar pulses, clutter from communication waveforms, and noise.

A version of the iterative algorithm using 1-step ahead prediction is shown below in Algorithm 2. In this version, each required update step is achieved within one clock cycle without the need of waiting for a calculation step to be completed before a subsequent step can start. This particular form of iterative algorithm enables massively parallel implementation of the de-noising algorithm.

Figure 9:
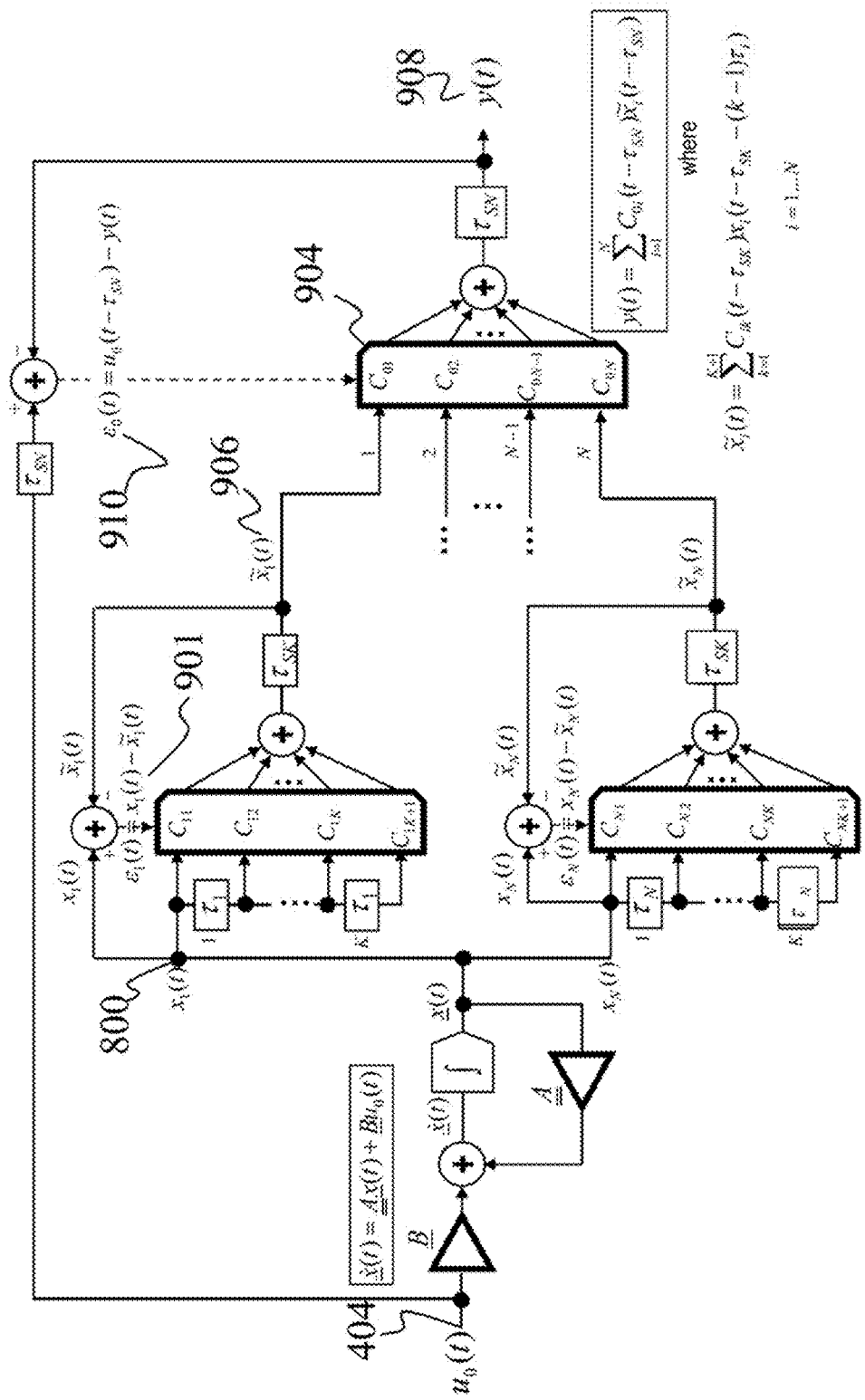
FIG. 9 is an illustration depicting a version of the cognitive signal processor architecture that uses localized feedback of each de-noised reservoir state element $\tilde{x}_i(t)$ to adapt the mixing weights $C_{ik}$, for $1 \le k \le K+1$, according to some embodiments of the present invention.

Algorithm 2: 1-Step Ahead Prediction Iterative Algorithm with 1-Step Output Latency
Initialization:

$\underline{x}[k] = \underline{0}, \underline{c}_k[K+1] = \underline{0}\ k=1,2,\ldots,(K+1)$ Iteration (starting at n=K+2):

$\underline{x}[n] = \underline{\tilde{A}}\underline{x}[n-1] + \underline{\tilde{B}}\begin{bmatrix} u[n] \\ u[n-1] \end{bmatrix}$ $\tilde{\varepsilon}[n] = u[n-1] - y[n-1]$ $\underline{c}_k[n] = (1 - \Delta t g_c)\underline{c}_k[n-1] + \Delta t \tilde{\mu}_c \tilde{\varepsilon}[n]\underline{x}[n-1-k]\ k=1,$ $2, \ldots, (K+1)$ $y[n] = \sum_{k=1}^{K+1} \underline{c}_k[n]^T \underline{x}[n-k]$ FIG. 9 illustrates an alternate localized architecture for the CSP. This architecture is massively parallel and hierarchical. In this architecture, the reservoir states 800 $x_1(t), x_N(t)$ are each predicted and de-noised independently. The state update error signals 901 $\varepsilon_i(t)$ are generated from the noisy input state variables 800 $x_i(t)$ and their denoised versions 906 $\tilde{x}_i(t)$. This learning is localized to each individual reservoir state element and it does not require any feedback information from the output signal 908 $y(t)$. Only the last output layer 904 that combines the de-noised states 906 $\tilde{x}_i(t)$ into the output 908 $y(t)$ uses global error 910 $\varepsilon_0(t)=u_0(t-\tau_{SN})-y(t)$, namely the difference between the input (delayed by $T_{SN}$) and output. This lack of global feedback enables the localized architecture to be more easily realized in distributed hardware.

Figure 10:
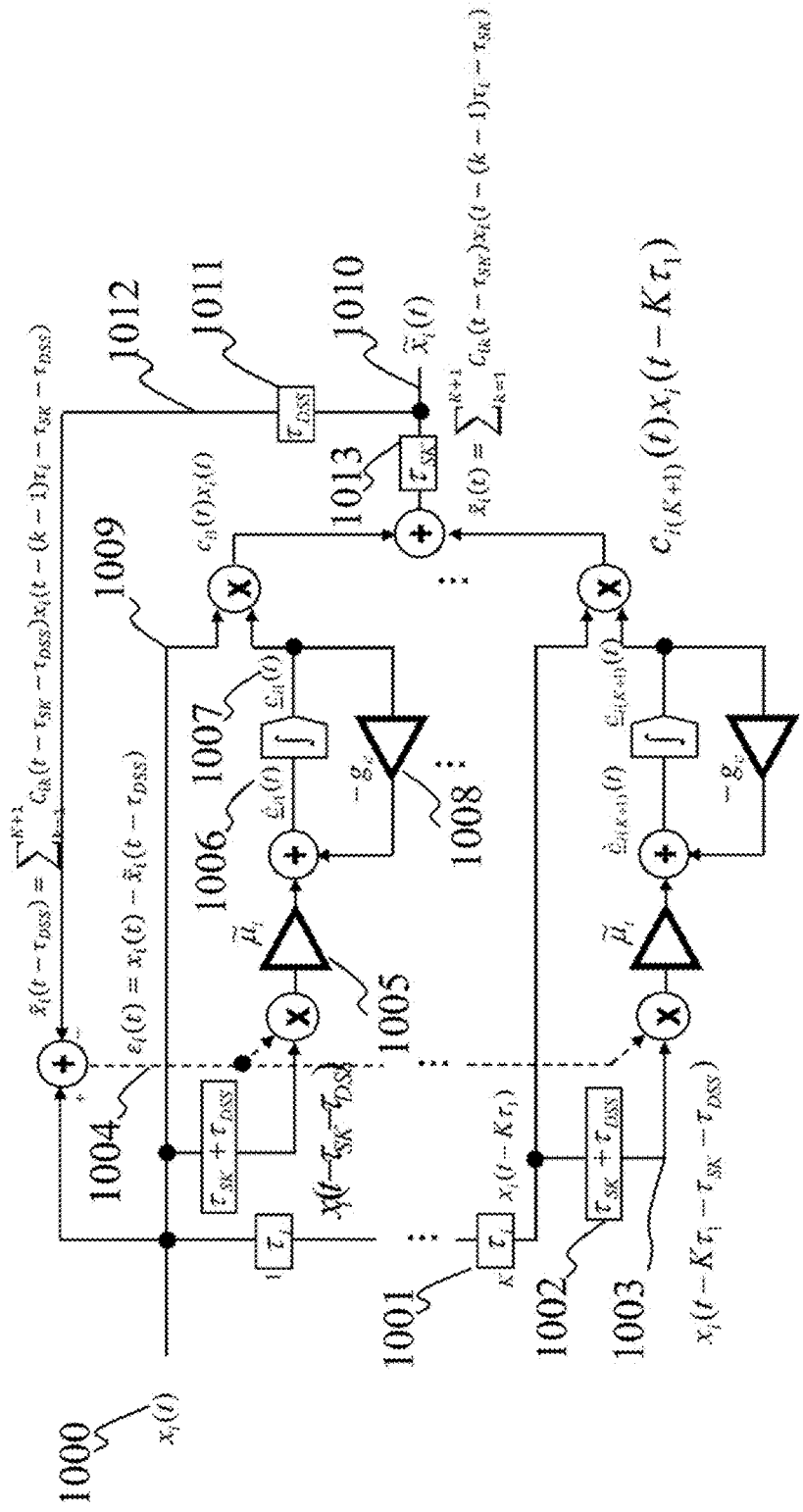
FIG. 10 is an illustration depicting an architecture for implementing the gradient-descent algorithm for adapting the mixing weights $C_{ik}$ in the localized architecture in FIG. 9 according to some embodiments of the present invention.

Finally, showing in FIG. 10 is a detailed continuous-time architecture for implementing the gradient descent-based adaptation of the mixing weight $C_{ik}$ for the localized CSP architecture in FIG. 9. Specifically, FIG. 10 illustrates a continuous-time architecture for implementing the set of dynamical systems $\dot{\underline{c}}_j(t)=-g_{cj}\underline{c}_j(t)+\mu_i\varepsilon_i(t)\bar{x}_i(t-\tau_{SK}-\tau_{DSS})$, for $1 \leq i \leq N$. As shown in FIG. 10, a reservoir state element 1000 $x_i(t)$ is sent into a length-K delay embedding with delay element 1001 $\tau_i$ and further delayed by 1002 $\tau_{SK}+\tau_{DSS}$ to obtain 1003 $x_i(t-(k-1)\tau_i-\tau_{SK}-\tau_{DSS})$. This delay-embedded element is then multiplied by the error signal 1004 $\varepsilon_i(t)=x_i(t)-\tilde{x}_i(t-\tau_{DSS})$ scaled by learning parameter 1005 $\mu_i$ before being input into an individual feedback dynamical system. The feedback dynamical system computes the change in the output layer element 1006 $\dot{\underline{c}}_{ik}(t)$ by combining this input with the current output layer element 1007 $\underline{c}_{ik}(t)$ scaled by forgetting factor 1008 $-g_c$. In this continuous time architecture, 1006 $\dot{\underline{c}}_{ik}(T)$ is transformed into 1007 $\underline{c}_{ik}(T)$ via a running integral. In a digital implementation, the running integral can be replaced with a running summation. The output layer elements 1007 $\underline{c}_{ik}(t)$ are then multiplied by their respective delay-embedded reservoir state elements 1009 $x_i(t-(k-1)\tau_i)$, summed together and delayed by 1013 $\tau_{SK}$ to obtain the de-noised reservoir state element 1010 $\tilde{x}_i(t)$. This de-noised reservoir state 1010 $\tilde{x}_i(t)$ is then delayed by 1011

$\tau_{DSS}$ and subtracted from the reservoir state element 1000 $x_i(t)$ to obtain the error signal 1004 $\varepsilon_i(t)$.

Notably, the output of the various CSP architectures described above and illustrated is a denoised waveform signal. The denoised waveform signal can then be used for a variety of purposes, depending on the application. For example and as referenced above in the Introduction section and described in further detail below, a device can be controlled based on the generation of the denoised waveform signal.

(4.6) Reduction to Practice

Described below are results demonstrating the denoising performance of the CSP on simulated and real signals containing mixtures of radar pulse waveforms and noise. All of the following results described below were demonstrated in a software simulation of the architecture show in FIG. 7. Given the results, it is clear that the present invention provides a considerable technological improvement over the state of the art denoising systems.

Figures 11A, 11B:
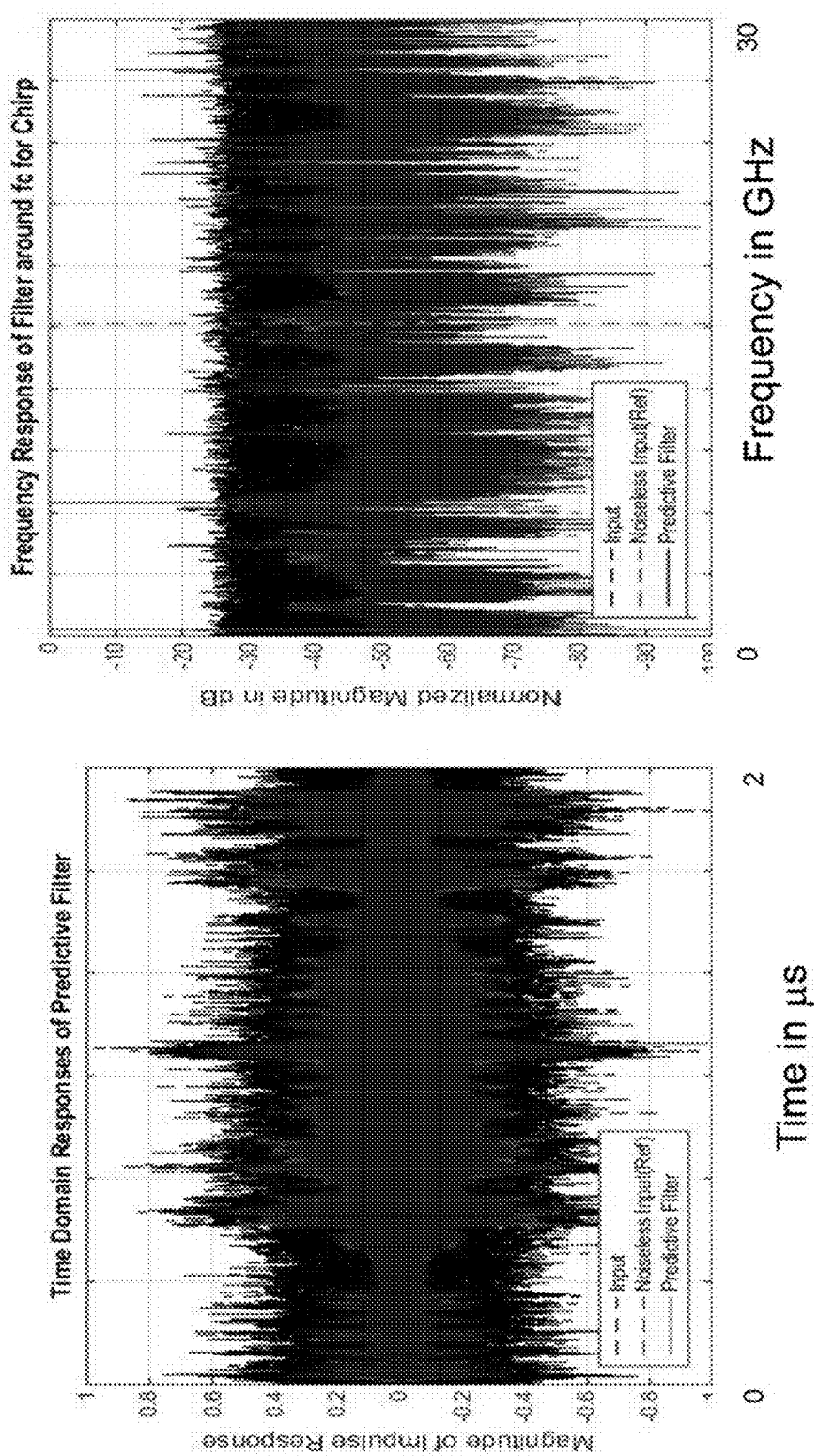
FIG. 11A is a plot graph illustrating signal denoising results of the system described herein in a simulated scenario with a signal containing 81 pulses, showing time domain responses.
FIG. 11B is a plot graph illustrating signal denoising results of the system described herein in a simulated scenario with a signal containing 81 pulses, showing frequency responses.

FIGS. 11A and 11B illustrate de-noising results on a complex ultra-wide bandwidth RF signal, showing time-domain response and frequency responses, respectively. The signal consisted of 81 one individual pulses where 80% of pulses were overlaps. The maximum pulse width was 100 ns except for one longer pulse. The simulation time length was 2 us and bandwidth was 30 GHz. The average SNR is 0 dB, i.e., 76 pulses are below the +12 dB noise floor required for signal detection in a channelized receiver. The pulses contained 15 different windowing functions, both frequency and phase modulated chirps, and 7 different Barker coded waveforms.

FIG. 11A shows the time domain waveform as plotted for the original noisy input (black), de-noised input or predictive filter response (blue), and ground truth or input without noise (red). Similarly, FIG. 11B shows time frequency domain plots of the input signal (black), the input without noise (red), and the predictive filter response (blue). The de-noised and ground truth time domain waveforms were strictly overlap. FIG. 11B shows the FFTs of the three time-domain waveforms. Again, the FFTs of the de-noised and ground truth time domain waveforms are strictly overlap. The real-time denoising algorithm has achieved an average 20 dB SNR improvement across the entire 30 GHz bandwidth.

Figure 12:
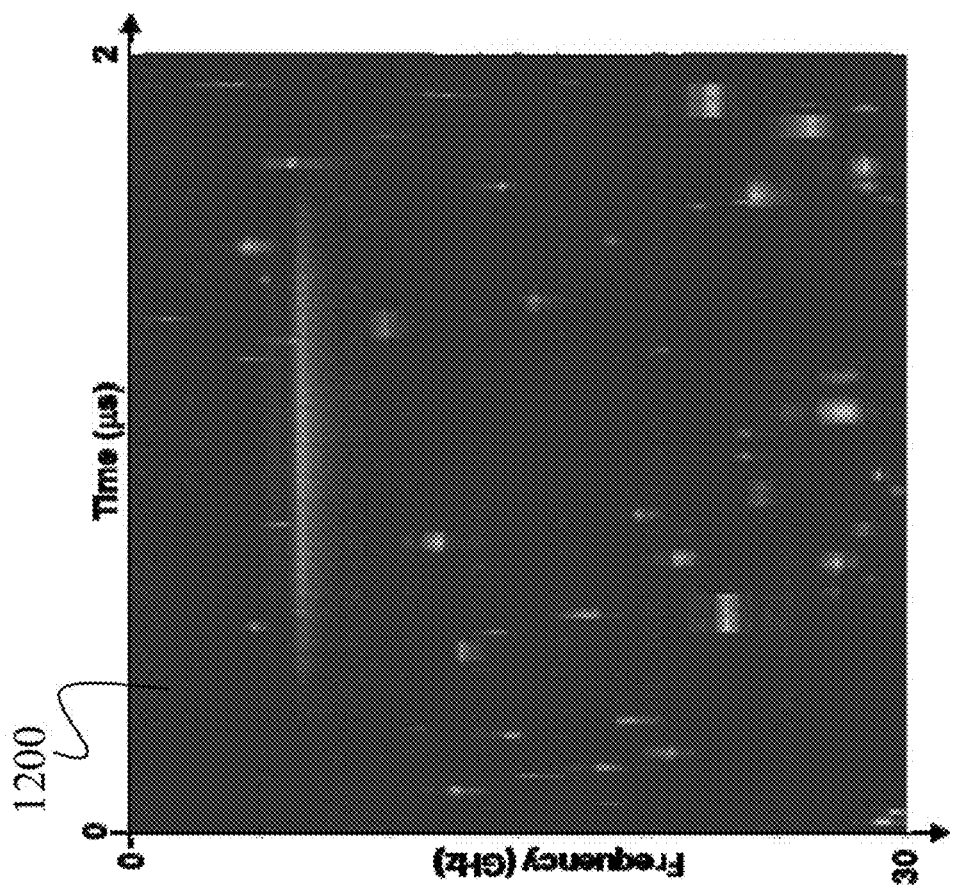
FIG. 12 is an illustration depicting a real-time spectrogram of the CSP denoiser output for the 81 pulses scenario of FIG. 10.

FIG. 12 shows the real-time spectrogram output 1200 for the 81 pulses using the architecture in FIG. 10. Even though the input signal is a complex mixture of many kinds of pulses with significant overlap, the spectrogram provides effective cues about the presence of pulses across frequencies and time to enable subsequent processing to detect, separate and track these pulses from the mixture.

Figure 13B:
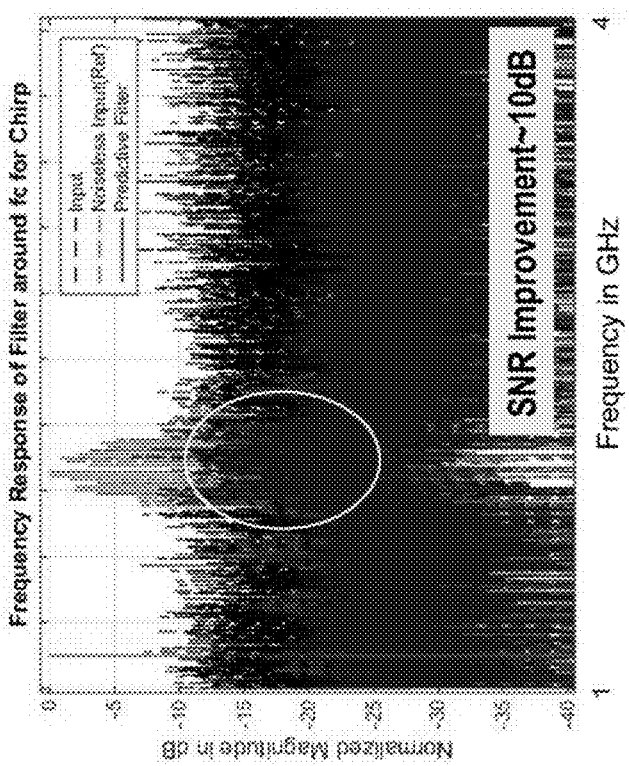
FIG. 13B is a frequency domain plot depicting results on a simulated scenario involving a random binary phase signal containing unknown noisy Low Probability of Intercept RF waveforms.
Figure 13A:
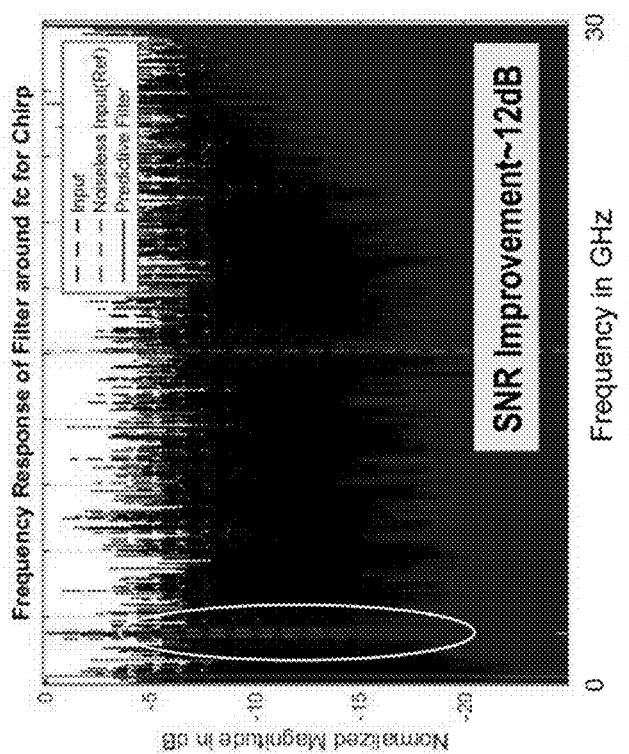
FIG. 13A is a frequency domain plot depicting results on a simulated scenario involving a linear chirp signal containing unknown noisy Low Probability of Intercept RF waveforms.

Additional experiments were performed to determine the limits of the CSP in extremely low SNR signal environments. FIGS. 13A and 13B show de-noising results of the system on challenging unknown noisy Low Probability of Intercept (LPI) RF signals/scenarios. The signals had extremely low SNR (−19 dB) and were complex modulated waveforms, i.e., linear chirp and random binary phase shift keying sequence. The simulated bandwidth was 30 GHz.

FIG. 13A shows the FFTs of the time domain waveforms for the original noisy input chirp (black), de-noised input chirp (blue), and ground truth (red). The FFT plots of the de-noised and ground truth signals partially overlap. The real-time denoising algorithm achieved an average 12 dB SNR improvement across the entire 30 GHz bandwidth for this challenging low SNR scenario.

FIG. 13B shows the FFTs of the time domain waveforms for the original noisy input random binary phase shift keying sequence (black), de-noised input random binary phase shift keying sequence (blue), and ground truth (red). The FFT plots of the de-noised and ground truth signals partially overlap. The real-time denoising algorithm achieved an average 10 dB SNR improvement across the entire 30 GHz bandwidth for this challenging low SNR scenario.

The performance of the CSP was also tested on real experimental data that was collected at a mountain range in California. Digital data were taken experimentally at the site by the SURE1 receiver over 10 GHz instantaneous bandwidth. 1-bit binary sequences were captured from ultra-wide bandwidth 1-bit delta and delta-sigma modulators and fed directly into the de-noising algorithm as inputs. The 1-bit modulators are superconducting ADCs developed by Hypres.

Figure 14B:
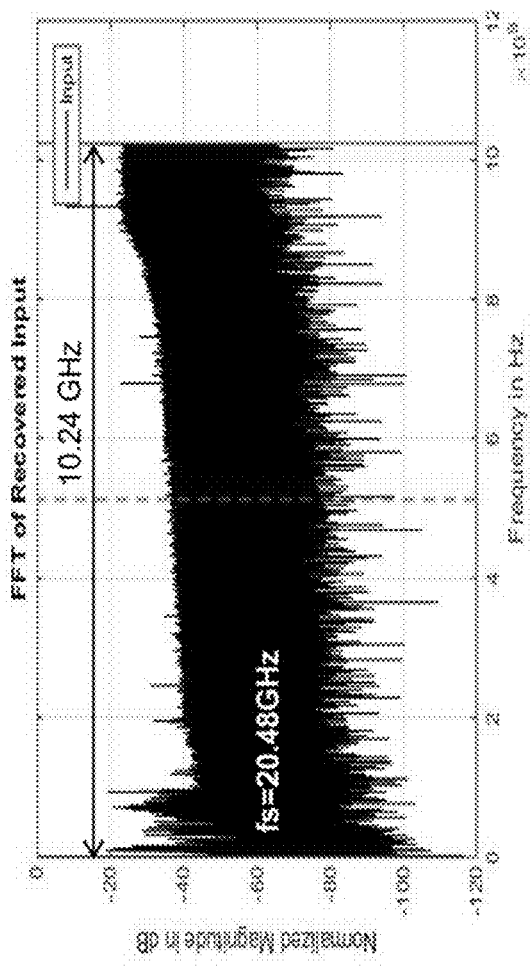
FIG. 14B is an illustration depicting Fast Fourier Transform (FFT) of a typical data collection recorded by a delta modulator clocked at 20.48 GHz.
Figure 14A:
FIG. 14A is an illustration of a photograph taken from a test mountain range.

FIG. 14A shows a photograph of the test range site, while FIG. 14B illustrates the FFT of a typical data collection recorded by a delta modulator clocked at 20.48 GHz. The direct FFTs of such recordings typically do not reveal any meaningful signal, especially in such a wide bandwidth due to the high quantization noise. In this experiment, the question was whether the CSP was capable of removing the quantization noise along with the other (thermal, flicker, etc.) noises.

Figure 15A:
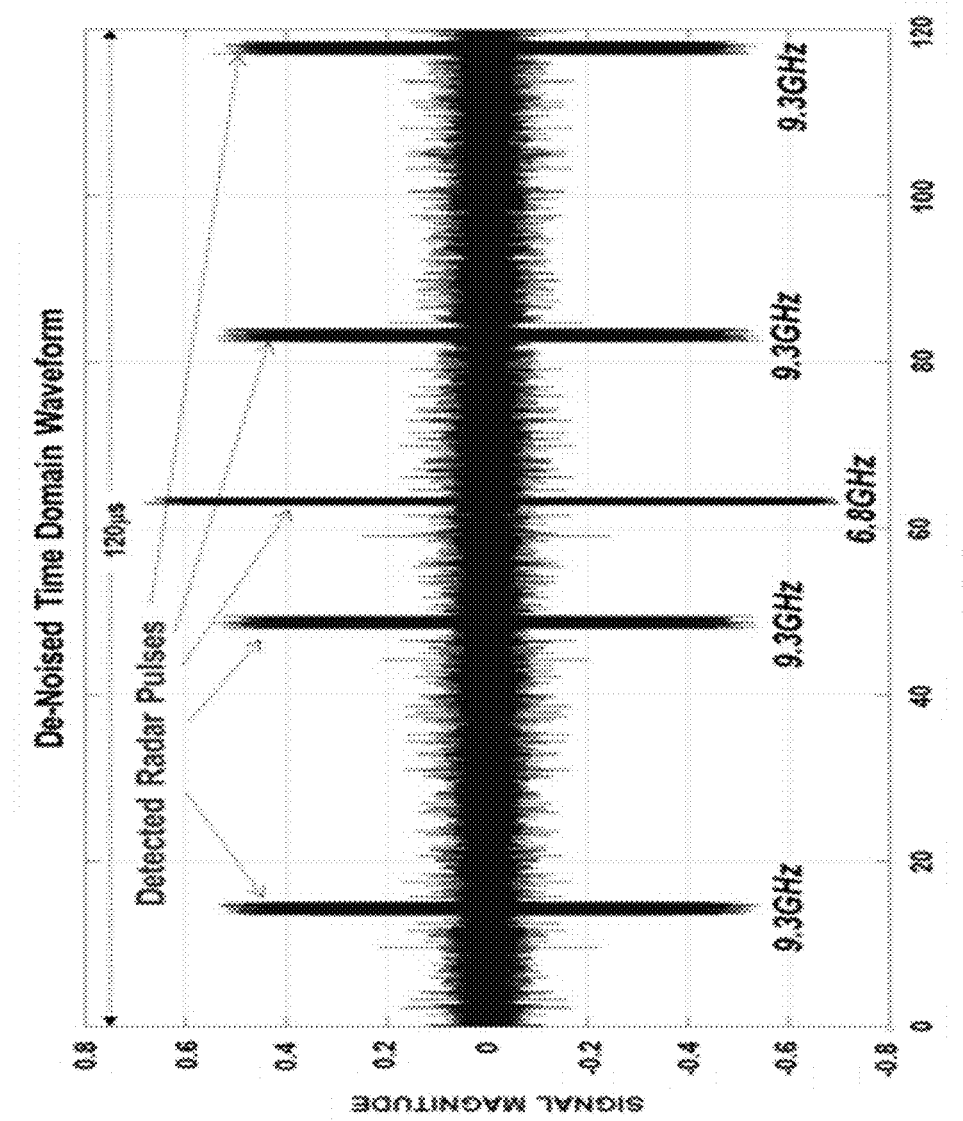
FIG. 15A is a plot graph illustrating performance of the cognitive signal processor on a 1-bit delta sequence whose FFT is shown in FIG. 14.
Figure 15B:
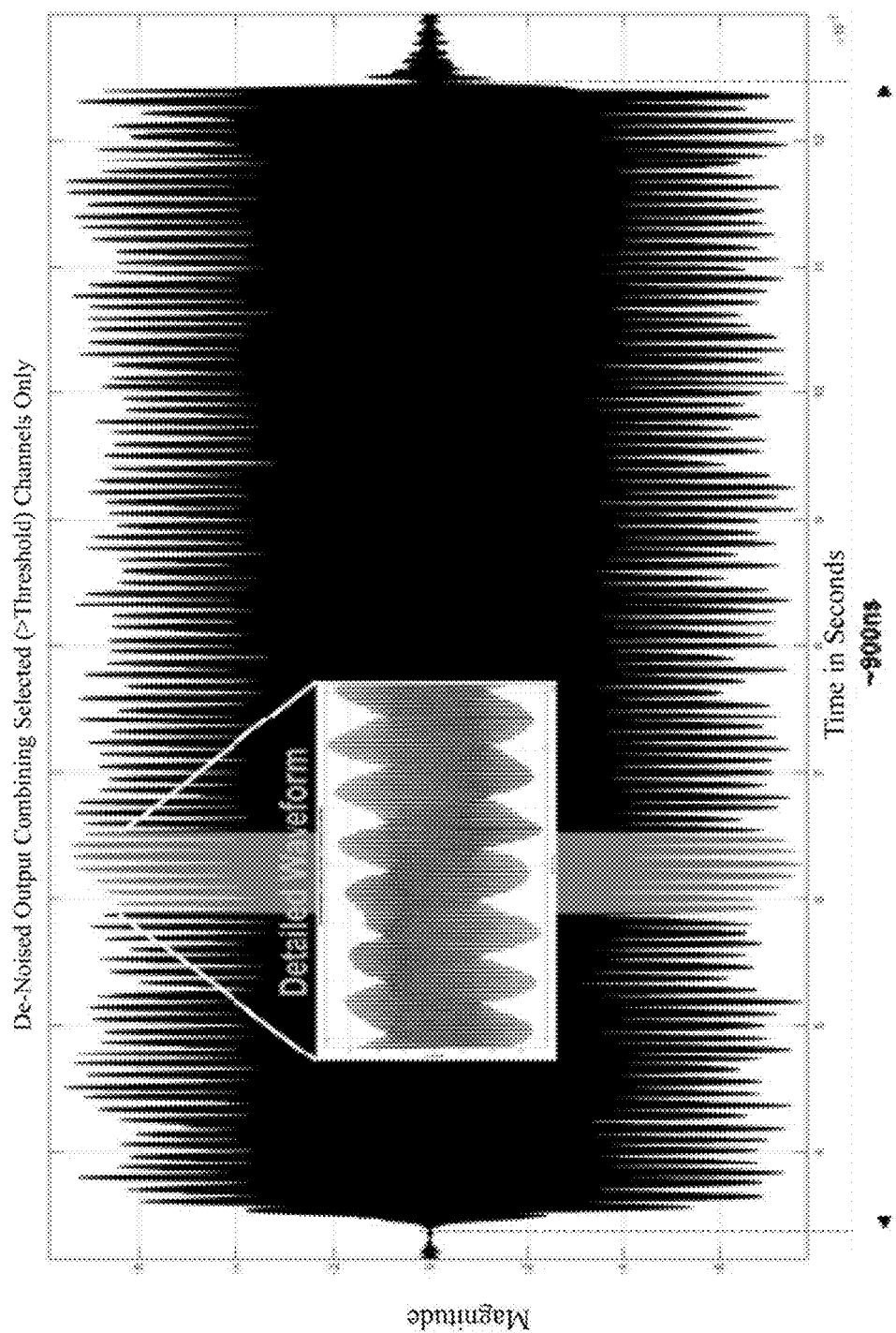
FIG. 15B is a plot graph illustrating denoised and reconstructed time domain waveforms, and also depicting a high quality real-time signal reconstruction of a 6.8 Ghz pulse.

FIG. 15A shows the de-noised time domain waveform for one of the recorded 1-bit sequences. The de-noised waveform clearly shows a periodic pulse sequence and an individual pulse in the middle of the plot. The periodic pulse sequence is centered around 9.3 GHz just below the Nyquist rate of the 1-bit ADC. The other detected individual pulse is centered around 6.8 GHz. FIG. 15B shows the detailed time domain waveform of the de-noised 6.8 GHz pulse. The time domain waveform clearly shows the amplitude modulation on the pulse, and turn on and off transients.

Figure 16A:
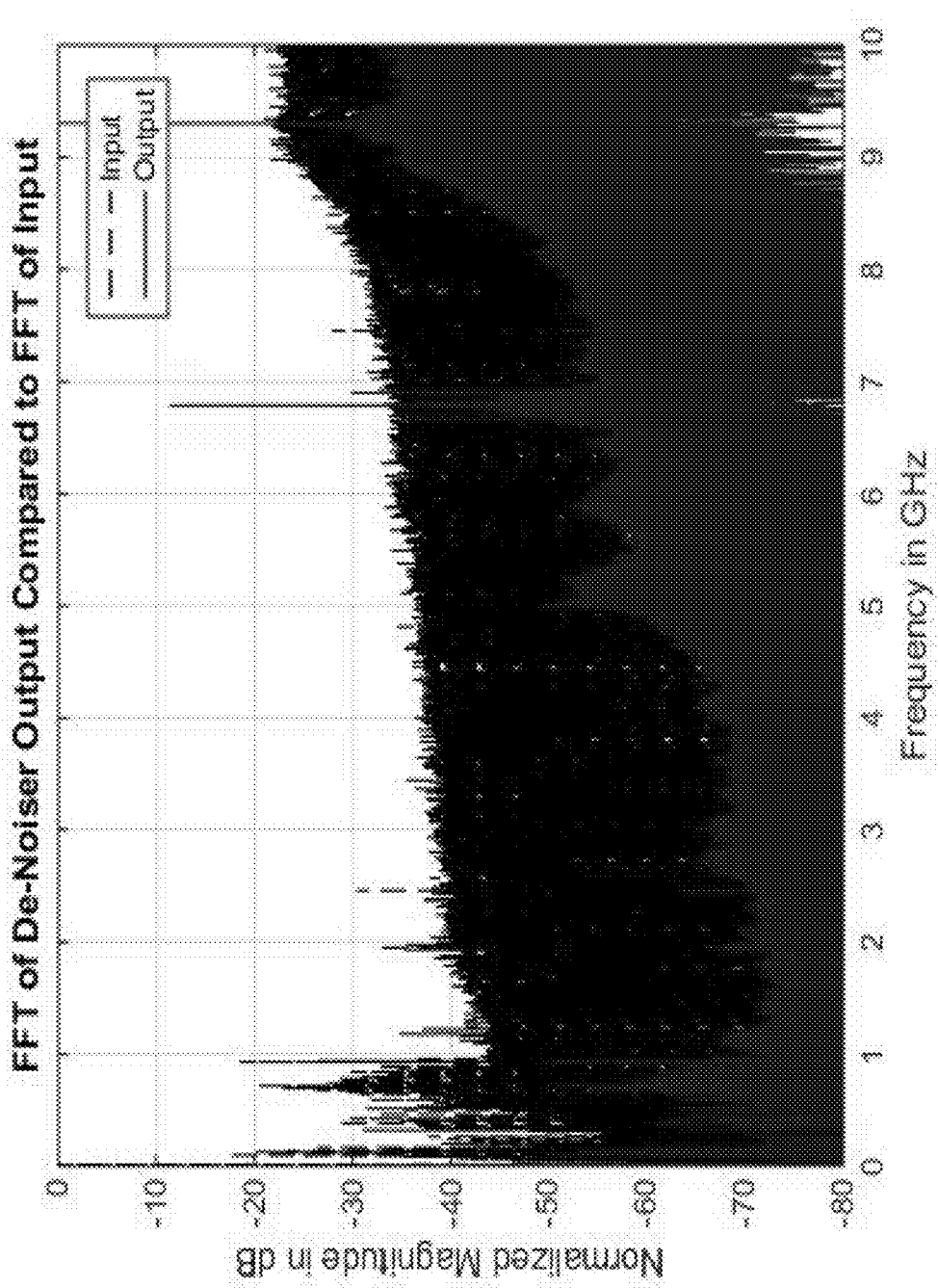
FIG. 16A is a plot graph illustrating a comparison of FFT of the cognitive signal processor denoiser output to FFT of input for the 1-bit delta sequence whose FFT is shown in FIG. 14.
Figure 16B:
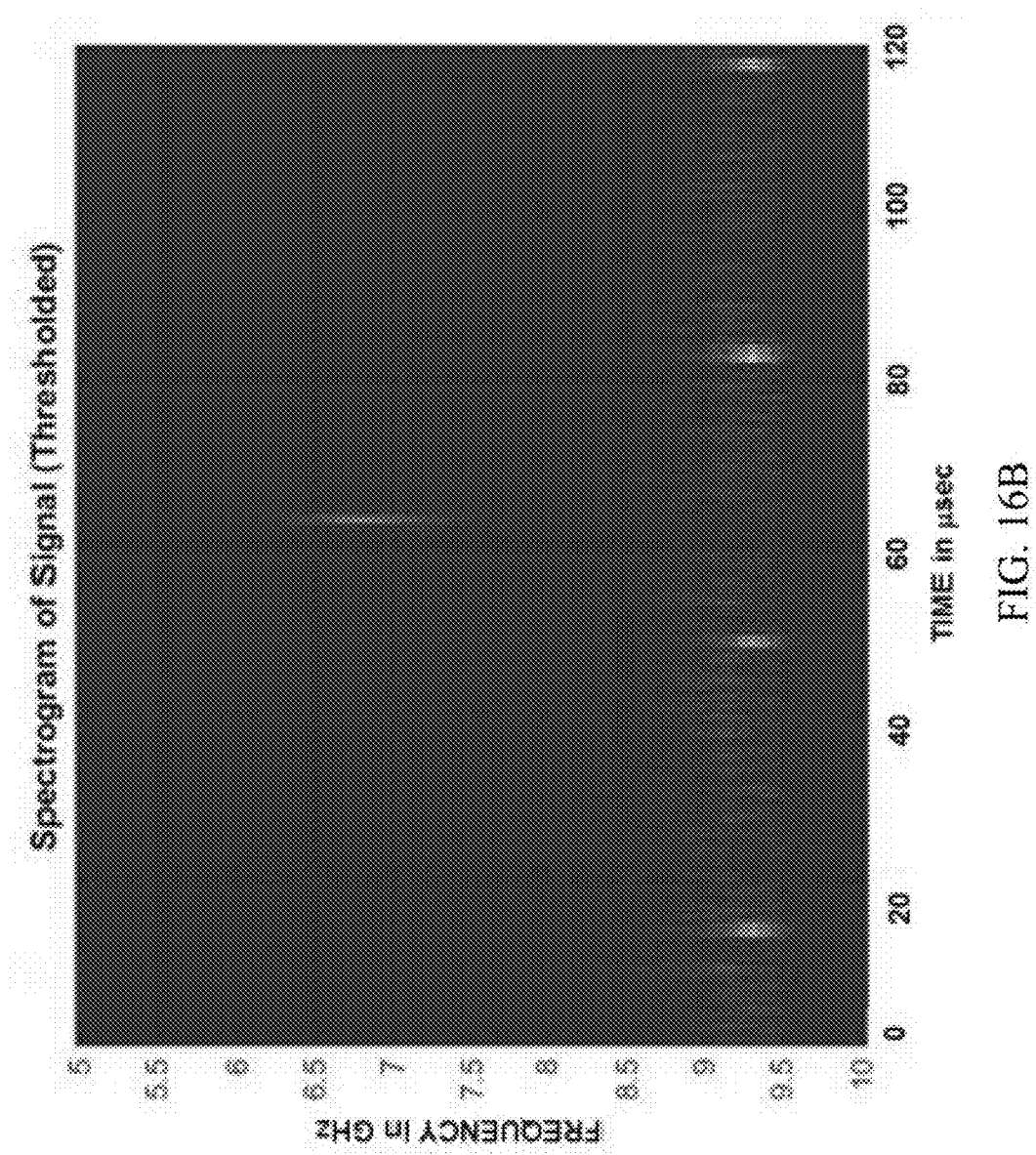
FIG. 16B is a real-time spectrogram image that is generated in real-time along with the output.

There was no ground truth available for this recording so the experimenters were not able to establish an SNR improvement number for this scenario using the time domain waveforms. However, the FFT plots of these time domain waveforms, shown in FIG. 16A, indicate a better than 20 dB SNR improvement in the entire 10 GHz bandwidth. In addition, FIG. 16B shows a real-time spectrogram image that was generated in real-time along with the output (de-noised input). The spectrogram is a time-frequency map of the signal where the time axis is the horizontal axis and the frequency axis is the vertical one. The two separate sets of pulses are clearly visible on the plot after the de-noising process.

Figure 17:
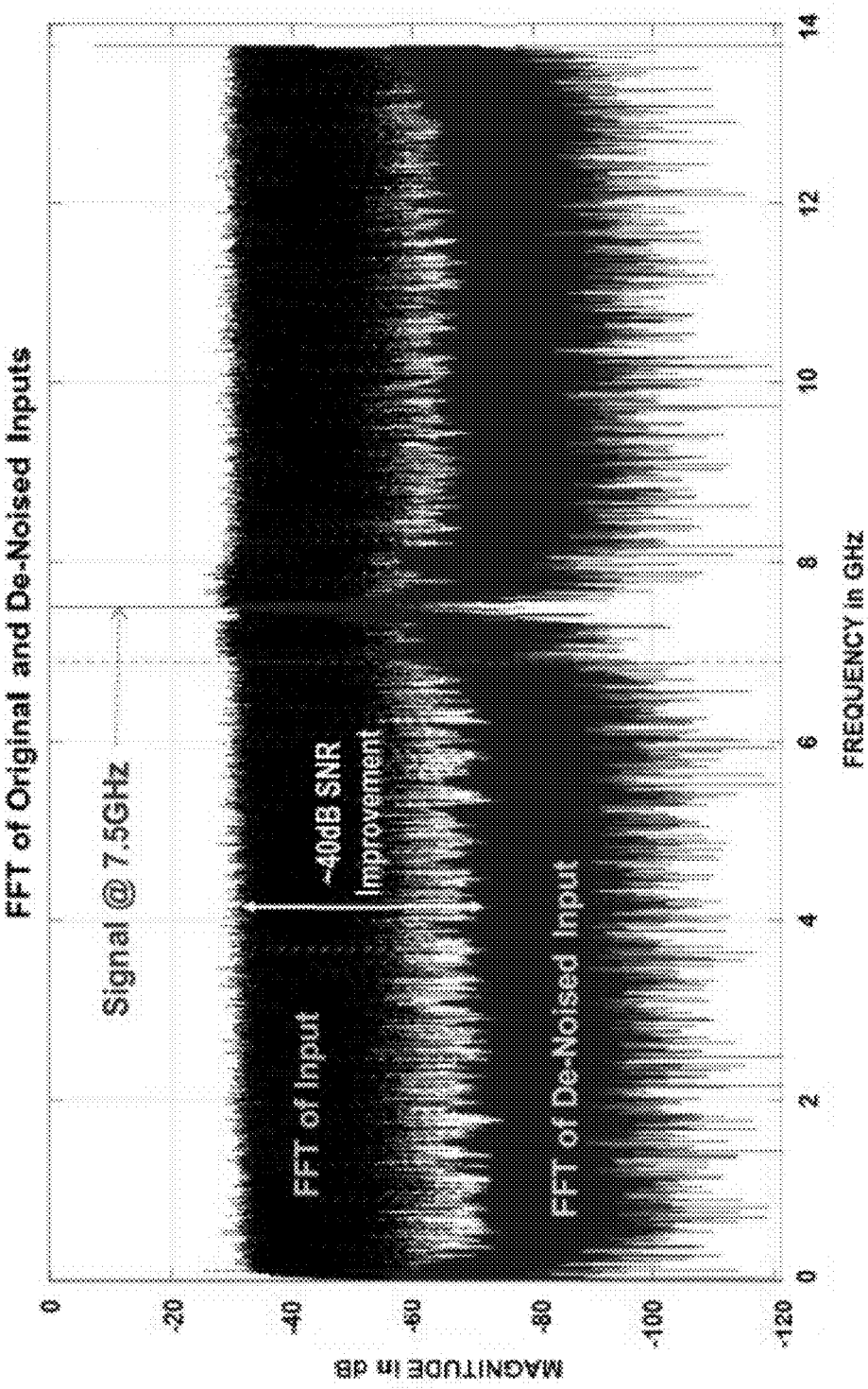
FIG. 17 is a plot graph illustrating a comparison of FFT of the cognitive signal processor denoiser output to FFT of input for the 1-bit delta-sigma sequence.

Finally, FIG. 17 shows FFTs of noisy and de-noised time domain waveforms recorded with a different Hypres 1-bit delta-sigma superconducting ADC. This particular recording was done at the Naval Research Laboratory. The FFT plot shows an average of 40 dB SNR improvement due to the CSP, demonstrating a dramatic technological improvement over the prior art.

Figure 18:
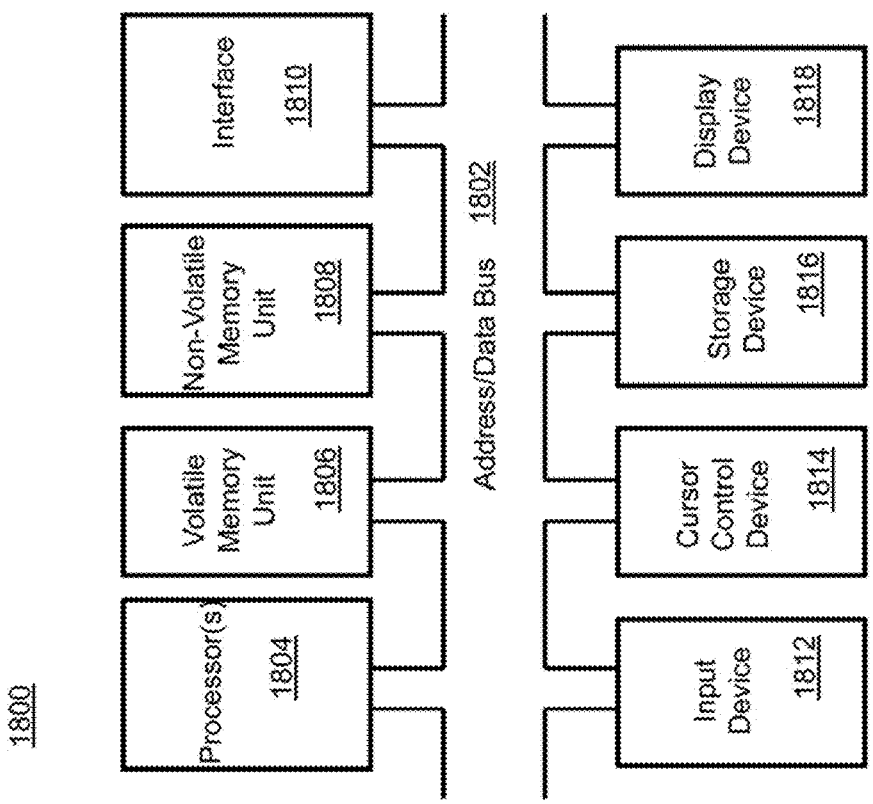
FIG. 18 is a block diagram depicting the components of a system according to various embodiments of the present invention.

As can be appreciated by those skilled in the art, the system or CSP described herein can be implemented in a variety of hardware and/or software. As a non-limiting example, a block diagram depicting an example of a system (i.e., computer system 1800) incorporating embodiments of the present invention is provided in FIG. 18. The computer system 1800 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 1800. When executed, the instructions cause the computer system 1800 to perform specific actions and exhibit specific behavior, such as described herein.

The computer system 1800 may include an address/data bus 1802 that is configured to communicate information. Additionally, one or more data processing units, such as a processor 1804 (or processors), are coupled with the address/data bus 1802. The processor 1804 is configured to process information and instructions. In an aspect, the processor 1804 is a microprocessor. Alternatively, the processor 1804 may be a different type of processor such as a parallel processor, application-specific integrated circuit (ASIC), programmable logic array (PLA), complex programmable logic device (CPLD), or a field programmable gate array (FPGA). A skilled person in the art of signal denoising will appreciate that the innovations in this disclosure may be embodied in various hardware implementations including but not limited to the foregoing. The foregoing implementations will be collectively referenced herein by FPGA.

The computer system 1800 is configured to utilize one or more data storage units. The computer system 1800 may include a volatile memory unit 1806 (e.g., random access memory ("RAM"), static RAM, dynamic RAM, etc.) coupled with the address/data bus 1802, wherein a volatile memory unit 1806 is configured to store information and instructions for the processor 1804. The computer system 1800 further may include a non-volatile memory unit 1808 (e.g., read-only memory ("ROM"), programmable ROM ("PROM"), erasable programmable ROM ("EPROM"), electrically erasable programmable ROM "EEPROM"), flash memory, etc.) coupled with the address/data bus 1802, wherein the non-volatile memory unit 1808 is configured to store static information and instructions for the processor 1804. Alternatively, the computer system 1800 may execute instructions retrieved from an online data storage unit such as in "Cloud" computing. In an aspect, the computer system 1800 also may include one or more interfaces, such as an interface 1810, coupled with the address/data bus 1802. The one or more interfaces are configured to enable the computer system 1800 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 1800 may include an input device 1812 coupled with the address/data bus 1802, wherein the input device 1812 is configured to communicate information and command selections to the processor 1800. In accordance with one aspect, the input device 1812 is an alphanumeric input device, such as a keyboard, that may include alphanumeric and/or function keys. Alternatively, the input device 1812 may be an input device other than an alphanumeric input device. In an aspect, the computer system 1800 may include a cursor control device 1814 coupled with the address/data bus 1802, wherein the cursor control device 1814 is configured to communicate user input information and/or command selections to the processor 1800. In an aspect, the cursor control device 1814 is implemented using a device such as a mouse, a track-ball, a track-pad, an optical tracking device, or a touch screen. The foregoing notwithstanding, in an aspect, the cursor control device 1814 is directed and/or activated via input from the input device 1812, such as in response to the use of special keys and key sequence commands associated with the input device 1812. In an alternative aspect, the cursor control device 1814 is configured to be directed or guided by voice commands.

In an aspect, the computer system 1800 further may include one or more optional computer usable data storage devices, such as a storage device 1816, coupled with the address/data bus 1802. The storage device 1816 is configured to store information and/or computer executable instructions. In one aspect, the storage device 1816 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 1818 is coupled with the address/data bus 1802, wherein the display device 1818 is configured to display video and/or graphics. In an aspect, the display device 1818 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 1800 presented herein is an example computing environment in accordance with an aspect. However, the non-limiting example of the computer system 1800 is not strictly limited to being a computer system. For example, an aspect provides that the computer system 1800 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 19:
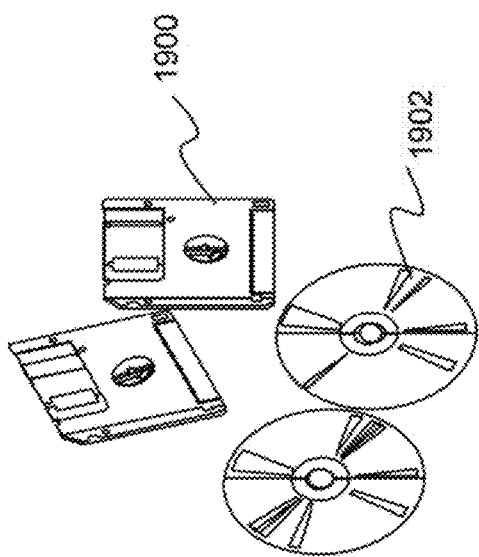
FIG. 19 is an illustration of a computer program product embodying an aspect of the present invention.

An illustrative diagram of a computer program product (i.e., storage device) embodying the present invention is depicted in FIG. 19. The computer program product is depicted as floppy disk 1900 or an optical disk 1902 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

As shown in FIG. 20 and as referenced above in the Introduction section, a processor 1804 may be used to control a device 2000 (e.g., a mobile device display, a virtual reality display, an augmented reality display, an autonomous vehicle, a computer monitor, a motor, a machine, a drone, a camera, etc.) based on the denoised waveform signal. The control of the device 200 may be used to transform the denoised waveform signal into a still image or video representing the object. In other embodiments, the device 2000 may be controlled to cause the device to move or otherwise initiate a physical action based on the denoised waveform signal.

In some embodiments, a drone or other autonomous vehicle may be controlled to move to an area where the localization of the object is determined to be based on the denoised waveform signal. In yet some other embodiments, a camera may be controlled to orient towards the origin of the denoised waveform signal. In other words, actuators or motors are activated to cause the camera (or sensor) to move or zoom in on the location where the object is located that is generating the original signal that ultimately results in the denoised waveform signal. In yet another aspect, if a system is seeking a particular object and if the object is not determined to be within the field-of-view of the camera after the denoising process, the camera can be caused to rotate or turn to view other areas within a scene until the sought after object is detected. Other non-limiting examples are provided throughout this disclosure. Thus, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A cognitive signal processor for signal denoising, the cognitive signal processor comprising:
   one or more processors configured to perform operations of:
   receiving a noisy signal, the noisy signal being a time-series of data points from a mixture of both noise and one or more desired waveform signals;
   linearly mapping the noisy signal to reservoir states of a dynamical reservoir;
   generating a high-dimensional state-space representation of the noisy signal by combining the noisy signal with the reservoir states;
   generating a delay-embedded state signal from the reservoir states;
   denoising the reservoir states by removing noise from each reservoir state signal, resulting in a real-time denoised spectrogram of the noisy signal for further processing; and
   generating a denoised waveform signal by combining the denoised reservoir states; and
   wherein the signal denoising process is implemented in software or digital hardware by converting the state-space representation of the dynamical reservoir to a system of delay difference equations and then applying a linear basis approximation.

2. The cognitive signal processor as set forth in claim 1, wherein the dynamical reservoir includes, for each reservoir state, an error function that is used to create the denoised reservoir state, the error function being a difference between a current reservoir state signal and a delayed denoised reservoir state signal.

3. The cognitive signal processor as set forth in claim 2, wherein the error function updates weights used in generating the denoised reservoir states, the weights being updated with the error function based on gradient descent.

4. The cognitive signal processor as set forth in claim 1, further comprising an operation of displaying at least one of the denoised waveform signal and the real-time denoised spectrogram on a Display Device.

5. The cognitive signal processor as set forth in claim 1, wherein the dynamical reservoir is a recurrent neural network with a plurality of nodes.

6. The cognitive signal processor as set forth in claim 1, wherein the dynamical reservoir includes a connectivity matrix having a block diagonal structure.

7. The cognitive signal processor as set forth in claim 1, wherein the dynamical reservoir includes an output layer having a set of summing nodes, each summing node receiving a weighted output from each delay-embedded state signal and summing the weighted output to generate the denoised waveform signal.

8. A cognitive signal processor for parallelized signal denoising, the cognitive signal processor comprising:
   one or more processors configured to perform operations of:
   receiving a noisy signal, the noisy signal being a time-series of data points from a mixture of both noise and one or more desired waveform signals;
   linearly mapping the noisy signal to reservoir states of a dynamical reservoir;
   generating a high-dimensional state-space representation of the noisy signal by combining the noisy signal with the reservoir states;
   generating a delay-embedded state signal from the reservoir states;
   denoising the reservoir states by removing the noise from each reservoir state signal independently in parallel, resulting in a real-time denoised spectrogram of the noisy signal for further processing; and
   generating a denoised waveform signal based on a weighted combination of the denoised reservoir states; and
   displaying least one of the denoised waveform signal and the real-time denoised spectrogram on a Display Device;
   wherein the signal denoising process is implemented in software or digital hardware by converting the state-space representation of the dynamical reservoir to a system of delay difference equations and then applying a linear basis approximation.

9. The cognitive signal processor as set forth in claim 8, further comprising an operation of displaying at least one of the denoised waveform signal and the real-time denoised spectrogram on a Display Device.

10. A computer program product for signal denoising, the computer program product comprising:
    a non-transitory computer-readable medium having executable instructions encoded thereon, such that upon execution of the instructions by one or more processors, the one or more processors perform operations of:
- receiving a noisy signal, the noisy signal being a time-series of data points from a mixture of both noise and one or more desired waveform signals;
- linearly mapping the noisy signal to reservoir states of a dynamical reservoir;
- generating a high-dimensional state-space representation of the noisy signal by combining the noisy signal with the reservoir states;
- generating a delay-embedded state signal from the reservoir states;
- denoising the reservoir states by removing noise from each reservoir state signal, resulting in a real-time denoised spectrogram of the noisy signal for further processing;
- generating a denoised waveform signal by combining the denoised reservoir states; and
- wherein the signal denoising process is implemented in software or digital hardware by converting the state-space representation of the dynamical reservoir to a system of delay difference equations and then applying a linear basis approximation.

11. The computer program product as set forth in claim 10, wherein the dynamical reservoir includes, for each reservoir state, an error function that is used to create the denoised reservoir state, the error function being a difference between a current reservoir state signal and a delayed denoised reservoir state signal.

12. The computer program product as set forth in claim 11, wherein the error function updates weights used in generating the denoised reservoir states, the weights being updated with the error function based on gradient descent.

13. The computer program product as set forth in claim 10, further comprising an operation of displaying at least one of the denoised waveform signal and the real-time denoised spectrogram on a Display Device.

14. The computer program product as set forth in claim 10, wherein the dynamical reservoir is a recurrent neural network with a plurality of nodes.

15. The computer program product as set forth in claim 10, wherein the dynamical reservoir includes a connectivity matrix having a block diagonal structure.

16. The computer program product as set forth in claim 10, wherein the dynamical reservoir includes an output layer having a set of summing nodes, each summing node receiving a weighted output from each delay-embedded state signal and summing the weighted output to generate the denoised waveform signal.

17. A computer implemented method for signal denoising, the method comprising an act of:
causing one or more processors to execute instructions encoded on a non-transitory computer-readable medium, such that upon execution, the one or more processors perform operations of:
- receiving a noisy signal, the noisy signal being a time-series of data points from a mixture of both noise and one or more desired waveform signals;
- linearly mapping the noisy signal to reservoir states of a dynamical reservoir;
- generating a high-dimensional state-space representation of the noisy signal by combining the noisy signal with the reservoir states;
- generating a delay-embedded state signal from the reservoir states;
- denoising the reservoir states by removing noise from each reservoir state signal, resulting in a real-time denoised spectrogram of the noisy signal for further processing;
- generating a denoised waveform signal by combining the denoised reservoir states; and
- wherein the signal denoising process is implemented in software or digital hardware by converting the state-space representation of the dynamical reservoir to a system of delay difference equations and then applying a linear basis approximation.

18. The method as set forth in claim 17, wherein the dynamical reservoir includes, for each reservoir state, an error function that is used to create the denoised reservoir state, the error function being a difference between a current reservoir state signal and a delayed denoised reservoir state signal.

19. The method as set forth in claim 18, wherein the error function updates weights used in generating the denoised reservoir states, the weights being updated with the error function based on gradient descent.

20. The method as set forth in claim 17, further comprising an operation of displaying at least one of the denoised waveform signal and the real-time denoised spectrogram on a Display Device.

21. The method as set forth in claim 17, wherein the dynamical reservoir is a recurrent neural network with a plurality of nodes.

22. The method as set forth in claim 17, wherein the dynamical reservoir includes a connectivity matrix having a block diagonal structure.

23. The method as set forth in claim 17, wherein the dynamical reservoir includes an output layer having a set of summing nodes, each summing node receiving a weighted output from each delay-embedded state signal and summing the weighted output to generate the denoised waveform signal.

* * * * *